(12) United States Patent
Lee

(10) Patent No.: US 11,505,265 B2
(45) Date of Patent: Nov. 22, 2022

(54) MULTIPURPOSE VEHICLE SYSTEM WITH INTERCHANGEABLE OPERATIONAL COMPONENTS AND POWER SUPPLIES

(71) Applicant: Alpha Motor Corporation, Irvine, CA (US)

(72) Inventor: Edward Lee, Irvine, CA (US)

(*) Notice: Subject to any disclaimer, the term of this patent is extended or adjusted under 35 U.S.C. 154(b) by 215 days.

(21) Appl. No.: 17/088,517

(22) Filed: Nov. 3, 2020

(65) Prior Publication Data

US 2022/0135158 A1   May 5, 2022

(51) Int. Cl.
  *B62D 63/02*  (2006.01)
  *B60L 53/80*  (2019.01)
  *B60L 53/51*  (2019.01)

(52) U.S. Cl.
  CPC ............ *B62D 63/025* (2013.01); *B60L 53/80* (2019.02); *B60L 53/51* (2019.02)

(58) Field of Classification Search
  CPC .................................................... B62D 63/025
  See application file for complete search history.

(56) References Cited

U.S. PATENT DOCUMENTS

| | | | | |
|---|---|---|---|---|
| 4,422,685 A * | 12/1983 | Bonfilio | ................. | B62D 65/04 296/193.04 |
| 6,099,039 A * | 8/2000 | Hine | .................... | B60G 11/181 180/311 |
| 6,276,477 B1 * | 8/2001 | Ida | ........................ | B62D 21/10 296/193.04 |
| 7,441,809 B1 * | 10/2008 | Coombs | ................. | B62D 65/04 280/781 |
| 8,177,277 B2 * | 5/2012 | Hedderly | ............... | B62D 23/00 296/203.03 |
| 9,404,717 B2 * | 8/2016 | Pfennig | .................... | F41H 7/048 |
| 11,377,089 B1 * | 7/2022 | Smith | .................... | B60K 25/02 |
| 2008/0017426 A1 * | 1/2008 | Walters | ................... | B60F 3/003 296/193.04 |
| 2013/0153314 A1 * | 6/2013 | Niedzwiecki | ............ | B60K 6/46 180/65.245 |
| 2014/0262583 A1 * | 9/2014 | Url | ....................... | B62D 33/023 296/183.1 |

(Continued)

*Primary Examiner* — Erez Gurari
(74) *Attorney, Agent, or Firm* — Elizabeth Yang

(57) ABSTRACT

A multipurpose vehicle system with interchangeable operational components and power supplies is operational in multiple operational modes. The operational modes include: a personal transport vehicle mode, a service vehicle mode, and a commercial vehicle mode. The vehicle system has a dimensionally adjustable chassis module. The chassis module has the capacity to detachably attach to multiple exterior, interior, motor, and transmission components. The chassis module supports a cabin module and a rear module that enables formation of different iterations of vehicles. The vehicle system provides multiple different and interchangeable power supplies, like a rechargeable battery and a hydrogen tank. The power supplies are interchangeable. The used components can be recycled and interchanged with new components. The vehicle system also comprises at least one autonomous trailer that comprises a receiver in communication with a transmitter in the chassis module, allowing the autonomous trailer to be remotely towed by the chassis module.

20 Claims, 23 Drawing Sheets

(56) References Cited

U.S. PATENT DOCUMENTS

| | | | |
|---|---|---|---|
| 2016/0046336 A1* | 2/2016 | Norman | B62D 63/025 |
| | | | 180/312 |
| 2016/0129958 A1* | 5/2016 | Byrnes | B60L 50/60 |
| | | | 180/12 |
| 2017/0001507 A1* | 1/2017 | Ashraf | B62D 21/07 |
| 2018/0237076 A1* | 8/2018 | Perlo | B60K 1/02 |
| 2018/0345971 A1* | 12/2018 | Birnschein | B60R 16/0231 |
| 2020/0139802 A1* | 5/2020 | Nagasaka | B60K 17/354 |
| 2020/0148292 A1* | 5/2020 | Hosbach | B62D 65/024 |
| 2020/0223485 A1* | 7/2020 | Wang | B62D 21/02 |
| 2021/0080974 A1* | 3/2021 | Mackin | G05D 1/0291 |
| 2021/0094459 A1* | 4/2021 | Caynak | B60L 50/40 |
| 2021/0138887 A1* | 5/2021 | Shih | G07C 5/0808 |
| 2021/0206432 A1* | 7/2021 | Willison | B62D 25/20 |
| 2021/0331749 A1* | 10/2021 | Hwang | B62D 63/025 |
| 2022/0017019 A1* | 1/2022 | Subramanian | B60P 3/42 |
| 2022/0055701 A1* | 2/2022 | Faga | B62D 65/16 |
| 2022/0135158 A1* | 5/2022 | Lee | B60L 50/71 |
| | | | 180/58 |
| 2022/0212736 A1* | 7/2022 | Bollinger | B62D 21/17 |

* cited by examiner

MULTIPURPOSE VEHICLE SYSTEM WITH INTERCHANGEABLE OPERATIONAL COMPONENTS AND POWER SUPPLIES

FIELD OF THE INVENTION

The present invention relates generally to a multipurpose vehicle system with interchangeable operational components and power supplies. More so, the present invention relates to an all-purpose vehicle that is configured for driving in multiple driving environments, and is operational in multiple operational modes, including a personal transport vehicle mode, a service vehicle mode, and a commercial vehicle mode; whereby the vehicle system is structured with a chassis module that is dimensionally adjustable, and has the capacity to detachably attach to multiple exterior, interior, motor, and transmission components, so as to produce different iterations of eclectic vehicles and vehicle modes; whereby multiple different power supplies, such as a rechargeable battery and a hydrogen tank, can be interchanged on the vehicle system; and whereby used components can be recycled and interchanged with new components.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, electric vehicles utilize electrical energy as a source of power. This electrical means can be a substitute for the vehicles using fossil fuels. Generally, electric vehicles are required to be equipped with batteries having a large capacity in order to propel the vehicle through large distances. The batteries of such vehicles are required to be charged periodically, which can be a cumbersome task.

Generally, an electric vehicle operates with an electric motor drive as well as a rechargeable battery system. The vehicle is operated using power stored within the batteries, and when the batteries require they can be recharged. It is known in the art that many consumers are motivated to purchase or drive an electric vehicle as an environmental choice, so as to minimize vehicle emissions.

Other proposals have involved modular electric vehicles. The problem with these modular electric vehicles is that they do not have the capacity to convert into different operational modes. Also, they cannot convert between an electrical and a hydrogen power source. Even though the above cited modular electric vehicles meets some of the needs of the market, a multipurpose vehicle system with interchangeable operational components and power supplies is configured for driving in multiple driving environments, and is operational in multiple operational modes, including a personal transport vehicle mode, a service vehicle mode, and a commercial vehicle mode; whereby the vehicle system is structured with a chassis module that is dimensionally adjustable, and has the capacity to detachably attach to multiple exterior, interior, motor, and transmission components, so as to produce different iterations of eclectic vehicles and vehicle modes; whereby multiple different power supplies, such as a rechargeable battery and a hydrogen tank, can be interchanged on the vehicle system; and whereby used components can be recycled and interchanged with new components, is still desired.

SUMMARY

Illustrative embodiments of the disclosure are generally directed to a multipurpose vehicle system with interchangeable operational components and power supplies. The multipurpose vehicle system is an all-purpose vehicle that is configured for driving in multiple driving environments, and is operational in multiple operational modes. The operational modes may include: a personal transport vehicle mode, a service vehicle mode, and a commercial vehicle mode. In one embodiment, the multipurpose vehicle system is structured with a chassis module that is dimensionally adjustable. The chassis module has the capacity to detachably attach to multiple exterior, interior, motor, and transmission components.

The chassis module supports a cabin module and a rear module that enables formation of different iterations of eclectic vehicles and vehicle modes. Further, the multipurpose vehicle system provides multiple different and interchangeable power supplies, such as a rechargeable battery and a hydrogen tank. The power supplies are interchangeable. Advantageously, a minimal amount of fastening mechanisms, couplers, and tubing is required, due to the electrical or hydrogen powered configuration of the multipurpose vehicle system. Further, the used components can be recycled and interchanged with new components. In one embodiment, the vehicle system also comprises at least one autonomous trailer that comprises a receiver in communication with a transmitter in the chassis module, allowing the autonomous trailer to be remotely towed by the chassis module during motion.

In one aspect, the multipurpose vehicle system with interchangeable operational components and power supplies, comprises:
 a vehicle having a chassis module, a cabin module, and one or more rear operational modules,
 the chassis module defined by a front end, a rear end, a pair of lateral sides, and a power supply compartment, the chassis module having:
  at least one frame assembly;
  multiple wheels being detachably attachable to the frame assembly, the wheels being rotatable, so as to enable mobility of the chassis module;
  an electric motor operatively connected to the wheels for rotatably driving the wheels, the electric motor being detachably attachable to the frame assembly;
  a transmission assembly operatively joined with the wheels and the electric motor, the transmission assembly being operable to transmit power from the electric motor to the wheels, the transmission assembly being detachable from the chassis module; and
  a rechargeable battery pack operatively connected to the electric motor, the rechargeable battery pack being operable to charge the electric motor, the rechargeable battery pack being detachable from the power supply compartment of the chassis module;
 the cabin module detachably attached to the chassis module, the cabin module defined by a top end, a front end, a left side, a right side, a rear end having a receiving dock, and an interior space, the cabin module having:
  one or more front panels detachably attached to the front end of the cabin module;

one or more rear panels detachably attached to the rear end of the cabin module;
one or more side panels detachably attached to the left and right sides of the cabin module; and
one or more roof panels detachably attached to the top end of the cabin module; and
the one or more rear operational modules being interchangeably and detachably attached to the receiving dock at the rear end of the cabin module.

In another aspect, the one or more rear operational modules include at least one of the following: a van shell, a tanker, a delivery van shell, a dump truck trailer, and a waste truck trailer.

In another aspect, any combination of the rear operational modules attaches to the receiving dock at the rear end of the cabin module, such that multiple operational modes are formed.

In another aspect, the operational modes include at least one of the following: a personal transport vehicle mode, a service vehicle mode, and a commercial vehicle mode.

In another aspect, the chassis module comprises multiple attachment sites configured to enable detachable attachment to the cabin module.

In another aspect, the chassis module comprises a power inverter operatively connected to the electric motor.

In another aspect, the system further comprises multiple suspension devices operatively joined with the wheels, the suspension devices operable to maintain a vertical load on the wheels, the suspension devices being detachably attachable to the chassis module.

In another aspect, the rechargeable battery pack comprises a lithium ion battery pack.

In another aspect, the interior space contains one or more interior components.

In another aspect, the interior components include at least one of the following: a cushion, a display screen, a sound system, a central air system, and a trim.

In another aspect, the transmission assembly comprises a single-speed transmission assembly.

In another aspect, the suspension devices include at least one of the following: struts, shock absorbers, and springs.

In another aspect, the front and rear panels are operational to illuminate.

In another aspect, the roof panels include at least one of the following: a cargo mount, a roof extension, and a transparent sun roof.

In another aspect, the roof panels comprise a solar panel, the solar panel being operatively connected to the rechargeable battery pack.

In another aspect, the rechargeable battery pack receives electrical power through at least one of the following: a power cord, an electromagnetic induction mechanism, and the solar panel.

In another aspect, the system further comprises a fuel cell operatively connected to the electric motor, the fuel cell operable to charge the electric motor.

In another aspect, the system further comprises a hydrogen tank operatively connected to the fuel cell, the hydrogen tank being operable to power the fuel cell, the hydrogen tank being detachably attached to the power supply compartment;

In another aspect, the system further comprises at least one autonomous trailer comprising a receiver.

In another aspect, the chassis module comprises a transmitter in communication with the receiver of the at least one autonomous trailer.

In another aspect, the transmitter is operable to transmit a command signal for the autonomous trailer to follow the chassis module during motion.

In another aspect, the autonomous trailer mechanically links to the rear end of the chassis module through a tow bar.

In another aspect, the autonomous trailer comprises a backup rechargeable battery.

One objective of the present invention is to provide an all-purpose electric vehicle that is designed for use in various environments, and have replaceable and interchangeable components.

Another objective is to provide a vehicle that offers multiple modes of use easily interchanged, including a personal transport vehicle mode, a service vehicle mode, and a commercial vehicle mode.

Another objective is to provide recyclable components, and rechargeable batteries.

Yet another objective is to provide a chassis module that has adjustable dimensions.

An exemplary objective is to provide interchangeable panels, including lights, for the cabin module.

Additional objectives are to enable power supplies, such as rechargeable batteries and hydrogen tanks, to be easily interchanged to the chassis module.

Additional objectives are to provide an inexpensive to manufacture multipurpose vehicle system with interchangeable operational components and power supplies.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
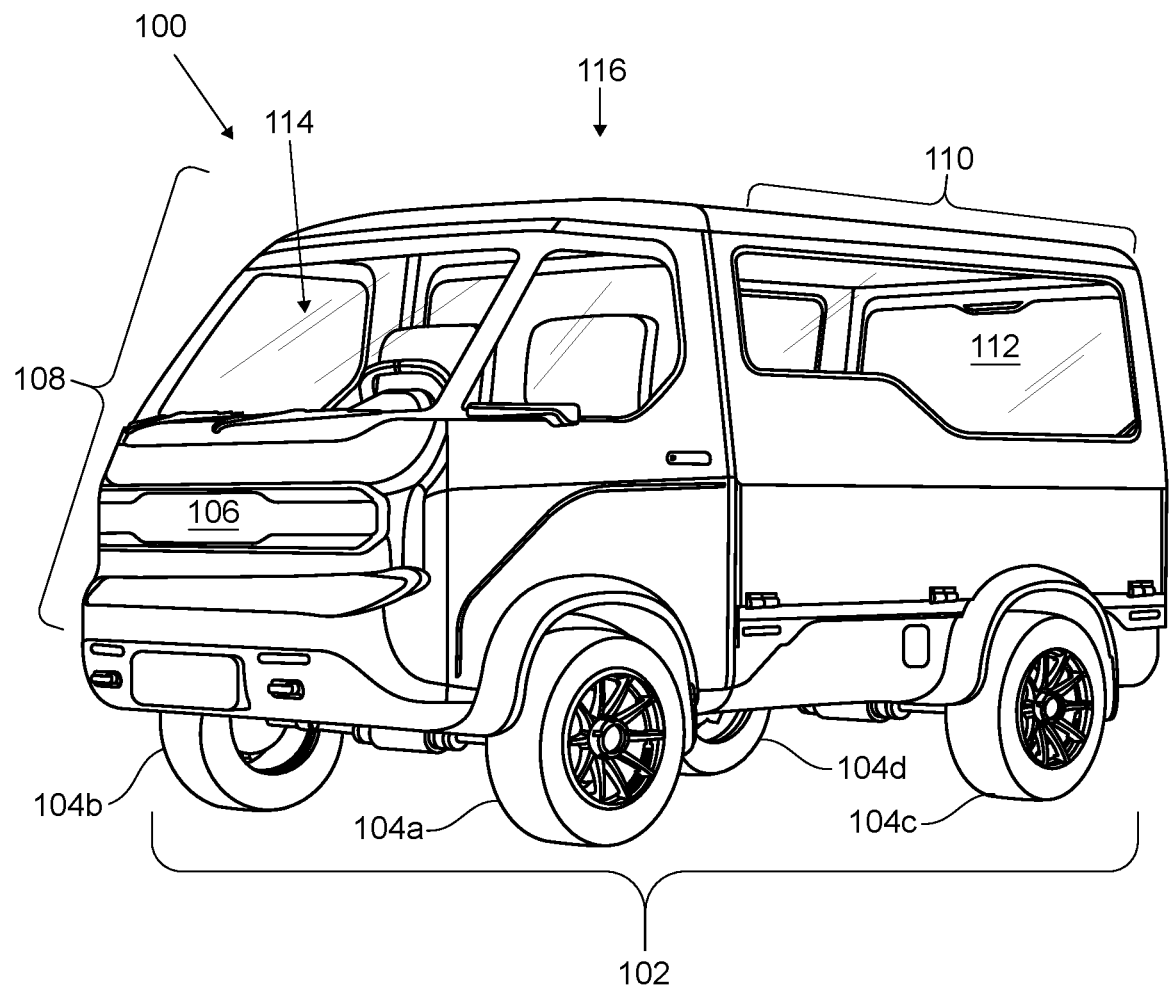
FIG. 1 illustrates a perspective view of an exemplary multipurpose vehicle system with interchangeable operational components and power supplies, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A multipurpose vehicle system 100 with interchangeable operational components and power supplies is referenced in FIGS. 1-17. The multipurpose vehicle system 100, hereafter "vehicle system 100" provides a unique all-purpose vehicle 116 that has multiple interchangeable and recyclable components. The foundation of the vehicle 116 rests on a chassis module 102 that supports wheels 104a-d, multiple interchangeable power sources, and a cabin module 108 that fits atop the chassis module 102, providing the form of the vehicle. Advantageously, the chassis module 102 supports both, rechargeable battery pack and a hydrogen tank, enabling the vehicle system 100 to be powered by, interchangeable power sources. Further, interchangeable rear operational modules 110 detachably and interchangeably attach to the rear end of the cabin module 108. The rear operational modules 110 create different operational modes for the vehicle system 100. Each operational mode enables the vehicle system 100 to change its structural shape and purpose in the lifetime of the vehicle. This enables body iterations with various utility options through such a modular structure.

Advantageously, as components are removed, replaced, or wear out over time, these used components can be recycled. Thus, not only is the battery rechargeable, but the vehicle itself is renewable. This is because the exterior and interior structure of the vehicle is built so that components can be replaced for various utilities and operational modes. The used components can be recycled and interchanged with new components. This increases the shelf life, and renewal capabilities of the vehicle. It is significant to note that the electric vehicle platform differentiated from modern skateboard-like electric vehicle structures because of renewable utility.

Looking now at FIG. 1, the vehicle system 100 comprises a chassis module 102 that supports all the vehicle components mentioned below. The chassis module 102 is a generally flat, rectangular, and rigid foundation. The chassis module 102 has a front end 200a that orients towards a forward direction traveled by the vehicle system 100, and an opposing rear end 200b. A pair of lateral sides 200c, 200d extend between the front and rear ends 200a, 200b of the chassis module 102. In one embodiment, a power supply compartment 202 provides a secure location to detachably fasten a power source thereto. The power supply compartment 202 may include a rectangular space that is sized and dimensioned to receive a fuel cell or a rechargeable battery.

In some embodiments, the vehicle system 100 can also change its dimensions. For this function, the longitudinal 300 and the width 302 of the chassis module 102 is size-adjustable. The adjustability may be possible through use of telescoping frames that form the periphery of the chassis module 102. However, the chassis module 102 may also have removable sections that enable the size to be reduced, or additional sections that can be added to increase the longitudinal 300 and the width 302 of the chassis module 102. This size adjustability allows for different operational modes for the vehicle system 100, as larger or smaller versions of the vehicle system 100 are created.

In some embodiments, the chassis module 102 has at least one frame assembly 214a, 214b to provide structural integrity and attachment points at the opposing ends 200a, 200b of the chassis module 102. The frame assembly can include a front frame assembly 214a at the front end of the chassis module 102, and a rear frame assembly 214b at the rear end of the chassis module 102. The frame assembly 214a-b can include a steel structure that provides rigidity to the chassis module 102. The frame assembly 214a-b also provides a mounting surface for the wheels 104a-d, suspension devices, cabin module 108, and other components. The frame assembly 214a-b also helps maintain balance of the vehicle 116, so as to improve driving performance.

Figure 3:
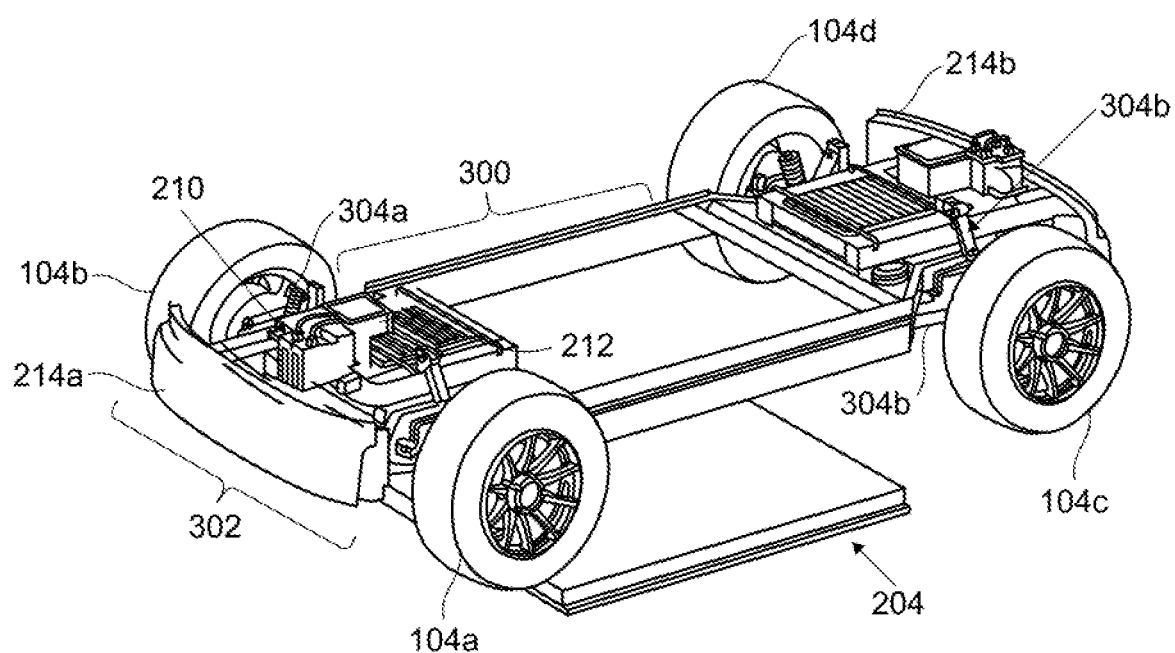
FIG. 3 illustrates a perspective view of an exemplary chassis module with rechargeable battery pack detached, in accordance with an embodiment of the present invention.

In some embodiments, the vehicle system 100 comprises multiple wheels 104a-d that are detachably attached to the frame assembly 214a, 214b. The wheels 104a-d can be at the corners of the frame assemblies 214a-b, as illustrated in FIG. 3. The wheels 104a-d are rotatable, so as to enable mobility of the chassis module 102. The wheels 104a-d may be rubber wheels, or may have a tire encompassing the wheels 104a-d. As illustrated, there may be four wheels 104a, 104b, 104c, 104d. However, in other embodiments, more or less than four wheels may be used. Different sizes and styles of wheels 104a-d can be attached and detached from the frame assembly to accommodate different operational modes.

The vehicle system 100 may also include multiple suspension devices 304a, 304b that are operatively joined with the wheels 104a-d. The suspension devices 304a-b are configured to maintain a vertical load on the wheels 104a-d, which creates a smoother ride. The suspension devices 3-4a-b are also detachably attachable to the chassis module 102. This allows for multiple types of suspension devices to be interchanged onto the chassis module 102. In some embodiments, the suspension devices may include, without limitation, struts, shock absorbers, and springs.

Looking now at FIG. 3, the vehicle system 100 comprises an electric motor 212, rather than an internal combustion engine, which is operatively connected to the wheels 104a-d. The electric motor 212 rotatably drives the wheels 104a-d to generate motion of the chassis module 102. In one possible embodiment, the electric motor 212 is detachably attachable to the frame assembly. This allows for multiple types of electric motor 212s to be interchanged onto the chassis module 102. As FIG. 4 shows, a second electric motor 408 may also be used, with each end of the chassis module 102 providing independent power to respective wheels 104a-d.

The chassis module 102 may also include a power inverter 210 to help regulate the electricity to and from the electric motor 212. In some embodiments, the power inverter 210 may include a device or circuitry that converts direct current to alternating current. This can be useful for operating an electric vehicle. In one possible embodiment, the power inverter 210 is operatively connected, and adjacent to, the electric motor 212.

In some embodiments, a transmission assembly 406 is operatively joined with the wheels 104a-d and the electric motor 212. The transmission assembly 406 is operable to transmit power from the electric motor 212 to the wheels 104a-d. In one non-limiting embodiment, the transmission assembly 406 comprises a single-speed transmission assembly. Those skilled in the art will recognize that an electric vehicle provides sufficient torque, such that multiple are not required. The transmission assembly 406 is detachable and interchangeable to the chassis module 102. This allows for multiple types of transmission assemblies to be interchanged onto the chassis module 102.

Figure 4:
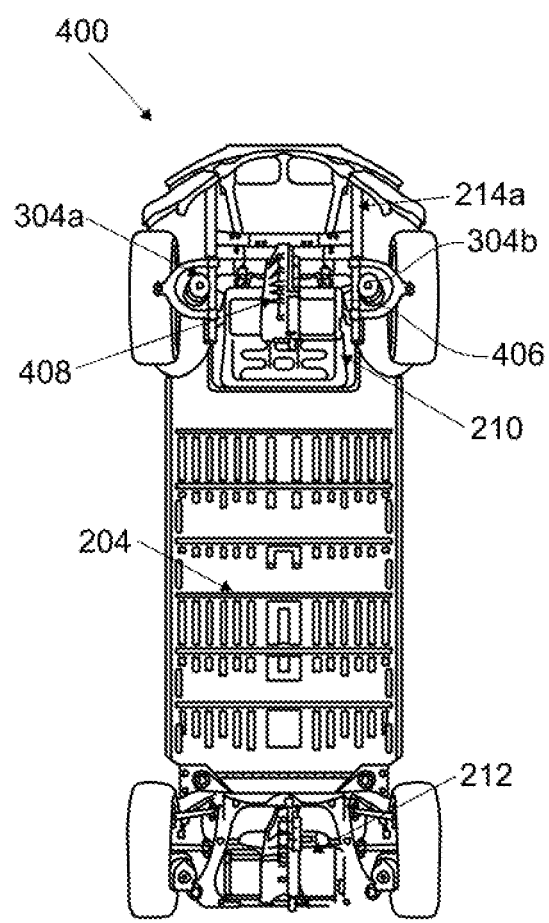
FIG. 4 illustrates a top view of an exemplary chassis module with an electrical powered battery configuration, in accordance with an embodiment of the present invention.

Looking now at FIG. 4, an electrical configured vehicle system 400 utilizes electricity for driving. In this arrangement, a rechargeable battery pack 204 provides the power. The rechargeable battery pack 204 is configured to detachably attaches to the chassis module 102. The rechargeable battery pack 204 provides electrical power, and is operatively connected to the electric motor 212. In one possible embodiment, the rechargeable battery pack 204 is configured to charge the electric motor 212 for driving the wheels. Also, the rechargeable battery pack 204 provides electrical power to accessories and ancillary components of the vehicle system 100. The rechargeable battery pack 204 is detachable, and replaceable, from the power supply compartment of the chassis module 102.

In one non-limiting embodiment, the rechargeable battery pack 204 is a lithium ion battery pack 204. However, in other embodiments, the rechargeable battery pack 204 utilizes different chemical elements and reactions therebetween to generate power. The rechargeable battery pack 204 may also be recyclable, such that after expiration, a new battery pack 204 replaces the used battery pack 204.

Figure 7A:
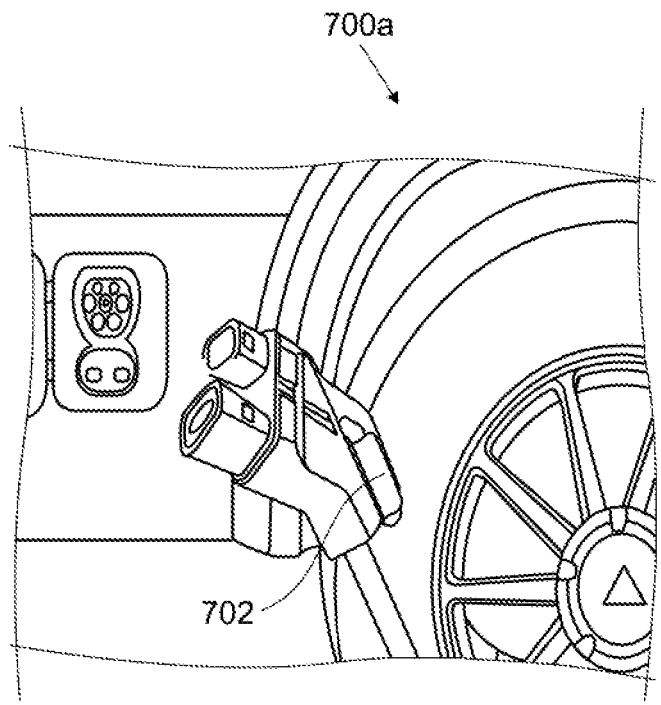
FIGS. 7A-7D illustrate multiple battery recharging means, including a cable charge, an induction charge, a replacement charge, and a solar panel charge, in accordance with an embodiment of the present invention.
Figure 7B:
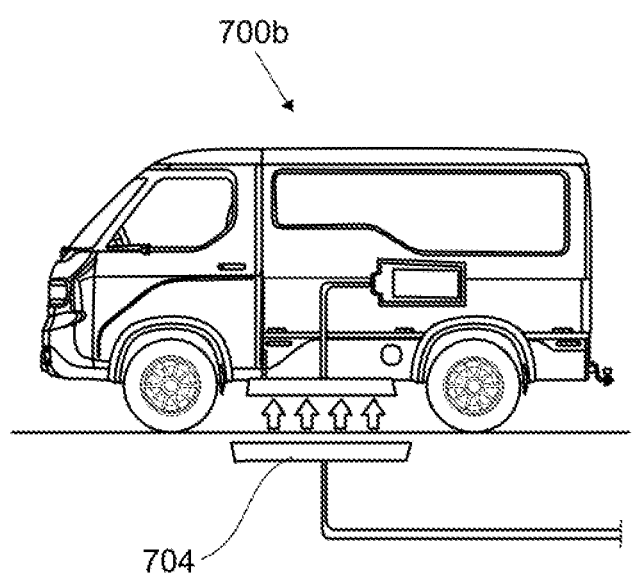

As illustrated in FIGS. 7A-7D, the rechargeable battery pack 204 can be recharged through multiple recharging means, known in the art. In some embodiments, the rechargeable battery pack 204 receives electrical power through a power cord 702, shown in FIG. 7A. The power cord 702 utilizes a charger that connects the vehicle battery pack through a charging port with a charging station that provides the source of electricity. Another source of charging, illustrated in FIG. 7B, is an electromagnetic induction mechanism 704. In this manner, the transfer of energy from the charger to a receiver in the bottom of vehicle occurs via electromagnetic induction.

Figure 7C:
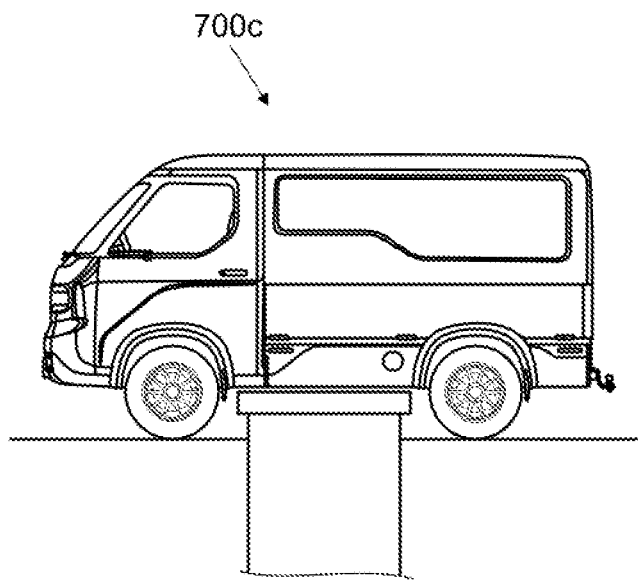
Figure 7D:
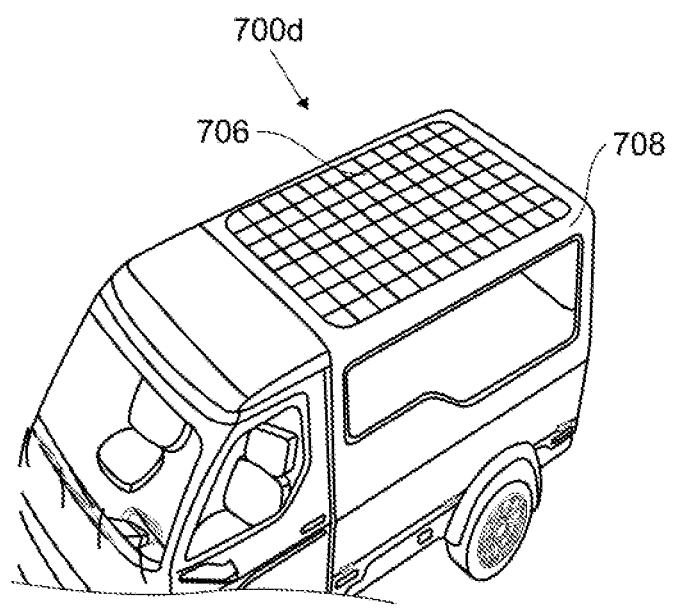

As FIG. 7C references, yet another charging means involves simply switching out a used battery pack for a new rechargeable battery pack. This involves the complete removal of the depleted battery and replacement with a new fully charged battery through assistance from automated machines. Finally, a solar panel 706 on the roof of the body panel provides solar energy (See FIG. 7D). In this solar configuration, a roof mounted solar panel converts sunlight into DC electricity to charge the battery. The DC electricity is fed to the battery via a solar regulator. Furthermore, in alternative embodiments, the vehicle system 100 comprises a power electronics controller that manages the flow of electrical energy that is delivered by the rechargeable battery pack 204, controlling the speed of the electric motor 212 and the torque it produces.

Figure 5:
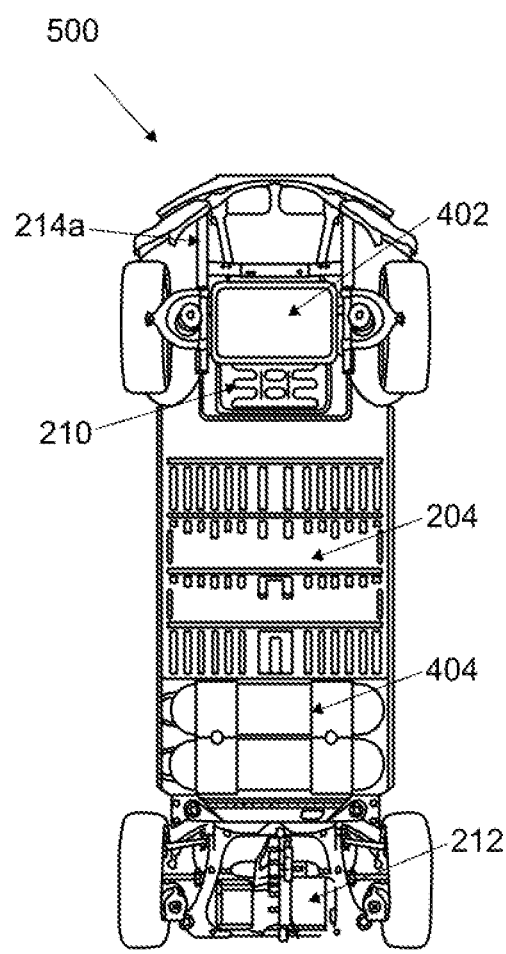
FIG. 5 illustrates a top view of an exemplary chassis module with a hydrogen powered configuration, in accordance with an embodiment of the present invention.

As FIG. 5 shows, a hydrogen-power configurated vehicle system 500 utilizes hydrogen gas for driving. The use of both an electrical configurated vehicle system 400, and a hydrogen-power configurated vehicle system 500 allows for multiple power sources to be interchangeably used. In the hydrogen-power configurated vehicle system 500, a fuel cell 402 is operatively connected to the electric motor 212. The fuel cell 402 is configured to charge the electric motor 212. And a hydrogen tank 404 is operatively connected to the fuel cell for powering the fuel cell. Like the rechargeable battery pack 204, the hydrogen tank 404 and the fuel cell 402 are detachably attached to the power supply compartment 202 of the chassis module 102. And similar to the rechargeable battery pack 204, the hydrogen tank 404 and the fuel cell 402 are recyclable. In any case, the vehicle system 100 can easily convert between electrical and hydrogen power sources.

Figure 6:
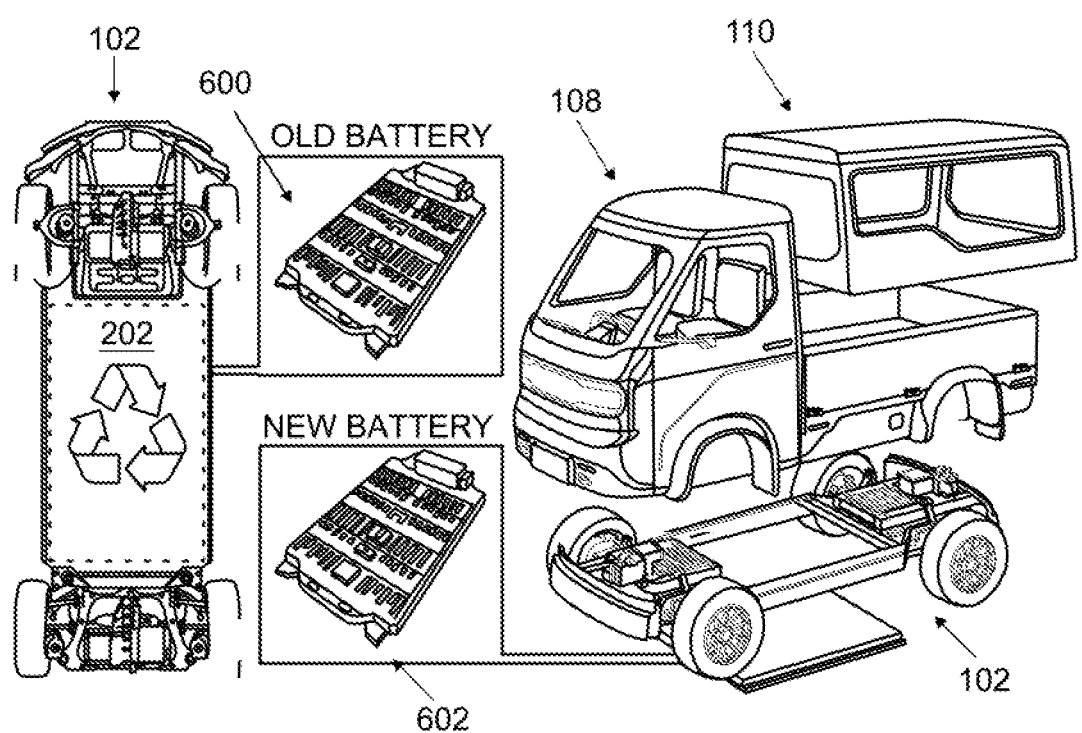
FIG. 6 illustrates a perspective view of an exemplary vehicle system having recyclable batteries, in accordance with an embodiment of the present invention.

And as FIG. 6 shows, the rechargeable battery pack and the hydrogen tank 404 are recyclable. An expired battery pack 600 is easily removed from the power supply compartment 202, and taken for appropriate recycling processes. A new battery pack 602 then replaces the expired battery pack 600. Furthermore, additional power sources may also be used interchangeably, and operatively fitted into the power supply compartment 202 for powering the electric motor 212. Such additional power sources may include, without limitation, ethanol power, waste vegetable oil power, compressed air power, wood-gas power, super capacitor power, hydraulic power, liquid nitrogen power, steam power, wind power, and nuclear power. In each case, a container for the power source fits into the power supply compartment 202 to feed the fuel cell 402 or electric motor 212.

Figure 2:
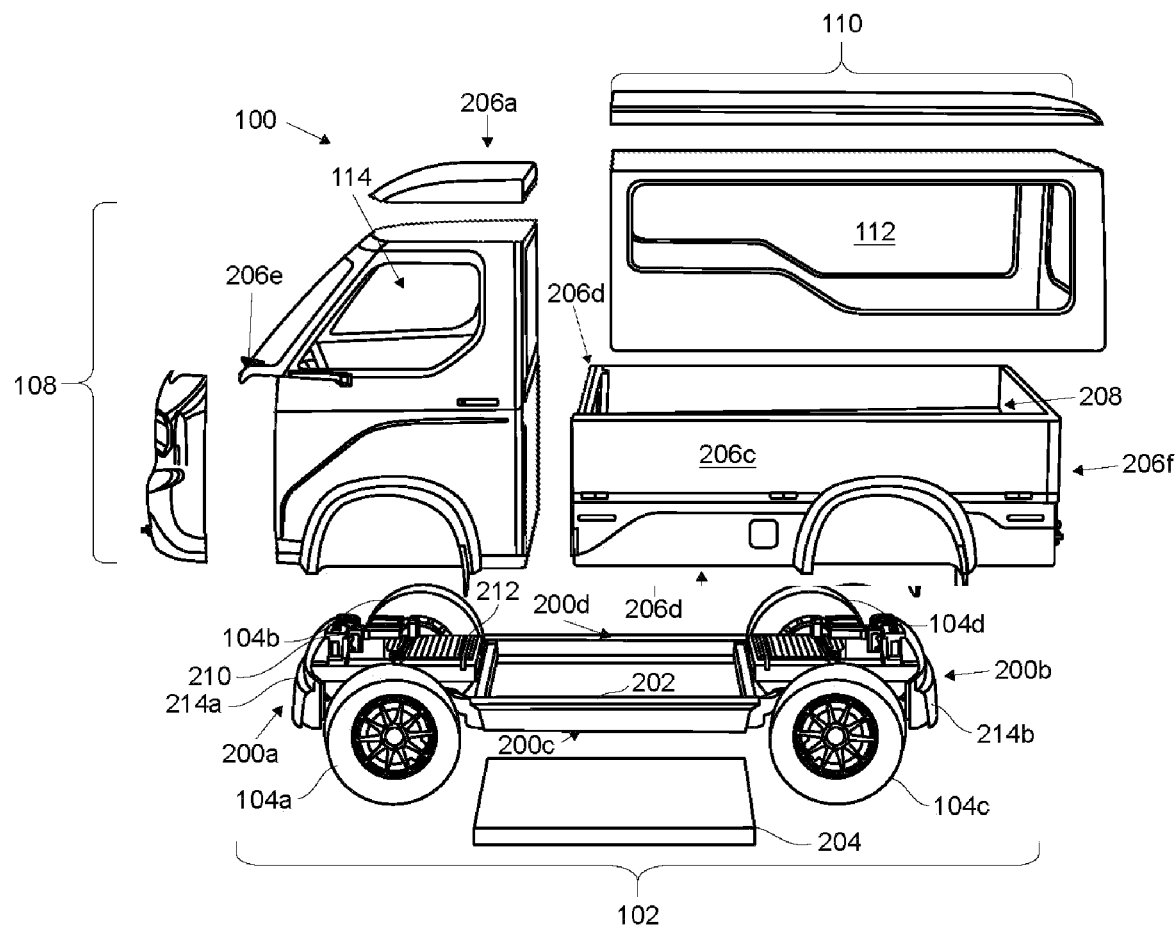
FIG. 2 illustrates a blow-up view of the multipurpose vehicle system shown in FIG. 1, in accordance with an embodiment of the present invention.

Looking back at FIG. 2, the vehicle system 100 provides a cabin module 108 that is configured to detachably attach to the chassis module 102. For attachment, the cabin module 108 is lifted, aligned with, and lowered onto the top surface of the chassis module, with both front ends 200a, 206e oriented in the same direction. In some embodiments, the cabin module 108 takes the shape of a vehicle cabin, including a sedan, a truck, and a semi cabin. The cabin module 108 has a top end 206a and an opposing bottom end 206b. The cabin module 108 also has a left side 206c, a right side 206d, a front end 206e, and a rear end 206f that forms a receiving dock 208.

As illustrated, the cabin module 108 fits directly onto the chassis module 102. The cabin module 108 securely fastens to the chassis module 102 in a snap fit relationship, or may utilize fasteners, such as bolts, magnets, screws, and the like to stay fastened to attachment points on the chassis module 102. In any manner, the cabin module 108 can also be interchanged. For example, a pickup truck cabin module 108 can be removed and replaced with a sedan cabin module 108.

Figure 8A:
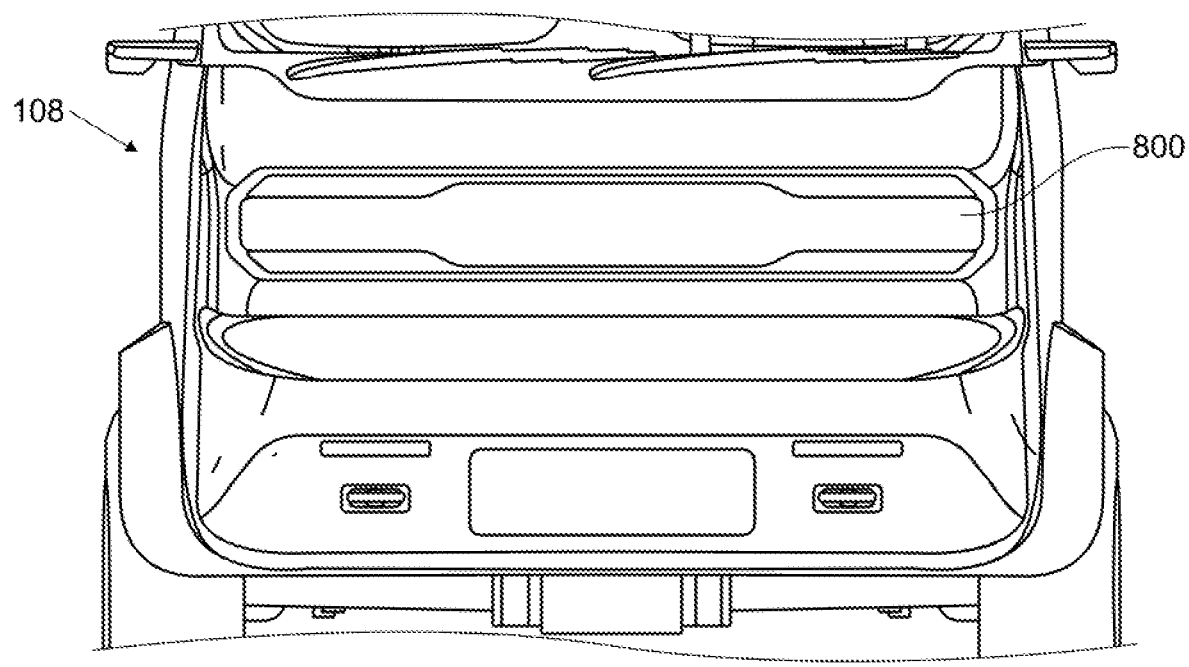
FIGS. 8A-8B illustrate front and rear views of lighting panels used on the cabin module, in accordance with an embodiment of the present invention.
Figure 8B:
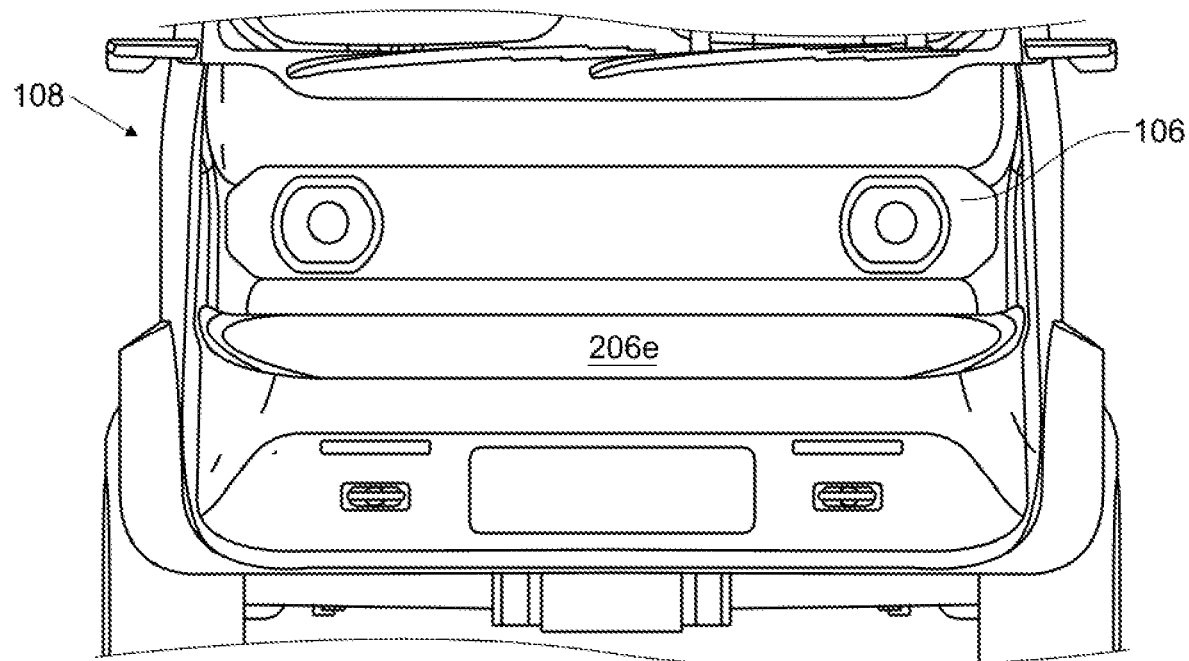

In some embodiments, the cabin module 108 has panels that can detachably attached thereto. As FIG. 8A shows, one or more front panels 106a, 106b detachably attach to the front end 206e of the cabin module 108. In another embodiment, one or more rear panels detachably attach to the rear end 206f of the cabin module 108. In some embodiments, the front and rear panels 800, 106 are operational to illuminate. However, a lighting system 100 may be built into the cabin module 108 or the chassis module 102.

As FIG. 8A shows, the front panel 106 have openings that allow the light to pass through. The shape and design of the openings in the front and rear panels can be different and interchanged, so as to provide different lighting effects. Furthermore, the front and rear panels 800, 106 may have indicia, coloring, patterns, and texture that provides a different visual for the vehicle system 100. For example, a sign indicating large loads or advertising can be printed onto the front and rear panels 800, 106.

Additionally, one or more side panels 112 detachably attach to the left and right sides 206c, 206d of the cabin module 108. The side panels 112 may have indicia, coloring, patterns, and texture that provides a different visual for the vehicle system 100. For example, a sign indicating school bus loaded with children can be printed onto the front and rear panels.

Continuing with the paneling on the cabin module 108, one or more roof panels 708 are used also. The roof panels 708 detachably attach to the top end of the cabin module 108. The roof panels 708 can serve functional uses, and thus are interchangeable. In some embodiments, the roof panels may include, without limitation, a cargo mount, a roof extension, a transparent sun roof, and a solar panel. In one embodiment, the solar panel is operatively connected to the rechargeable battery pack 204 for recharging.

In some embodiments, the cabin module 108 includes an interior space 114 in which the vehicle operator and passengers reside during operation of the vehicle system 100.

Figure 9A:
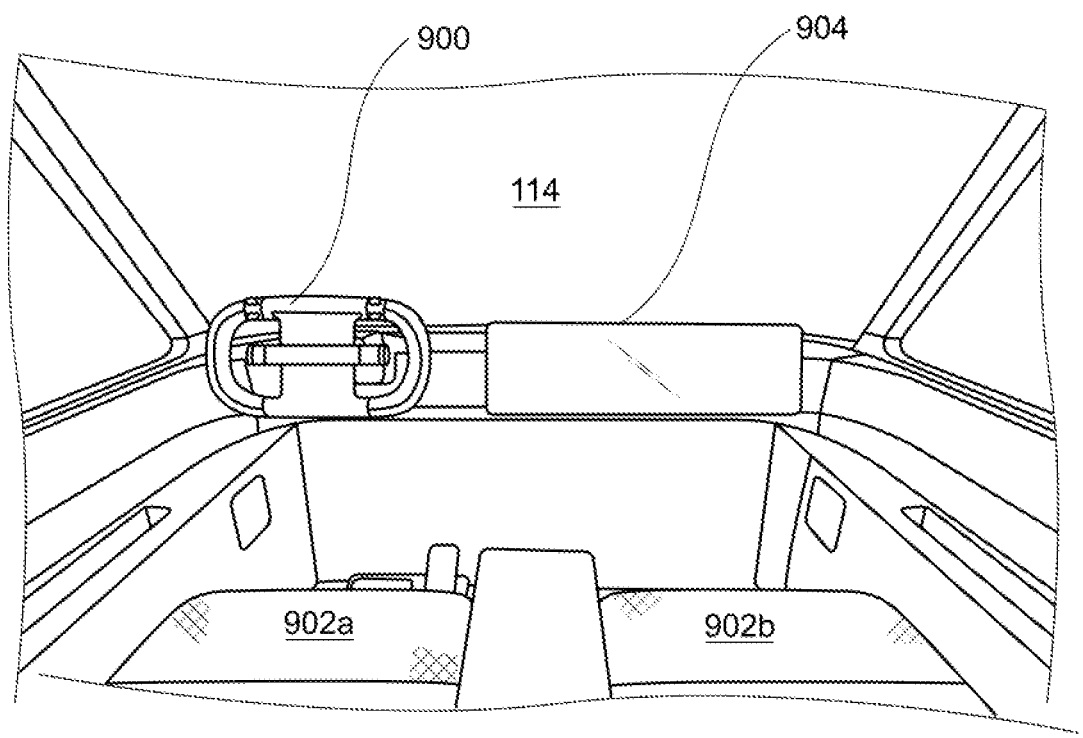
FIGS. 9A-9E illustrate perspective views of an interior space of a cabin module, in accordance with an embodiment of the present invention.

FIG. 9A illustrates an exemplary interior space 114 of a cabin module 108 from the point of view of the driver. Multiple interior components are contained in the interior space 114, so as to assist the operator in driving the vehicle 116. The detachably configurations and interchangeability allows the user to interchange the interior components, as desired.

In some embodiments, the interior components may include, without limitation, a seat cushion, a display screen, a sound system, a remote control, a central air system, and a trim. The interior components may include a steering wheel and a driver's seat cushion that orient towards the front end 206e of the cabin module 108 (See FIG. 9E). In one embodiment, the interior space 114 is where a vehicle operator sits to operate a steering wheel 900, an accelerator, a brake device, an entertainment system 904, lighting, at least one seat cushion 902a, 902b, and other accessories associated with a vehicle.

Figure 9B:
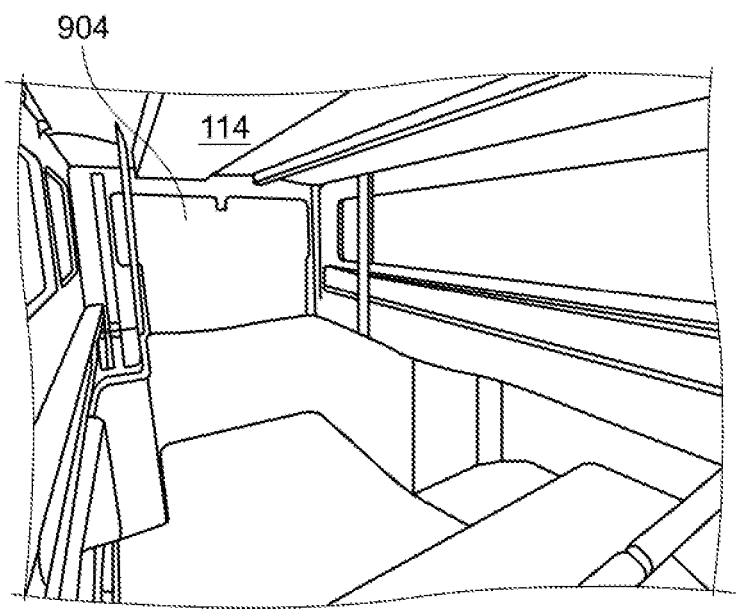
Figure 9C:
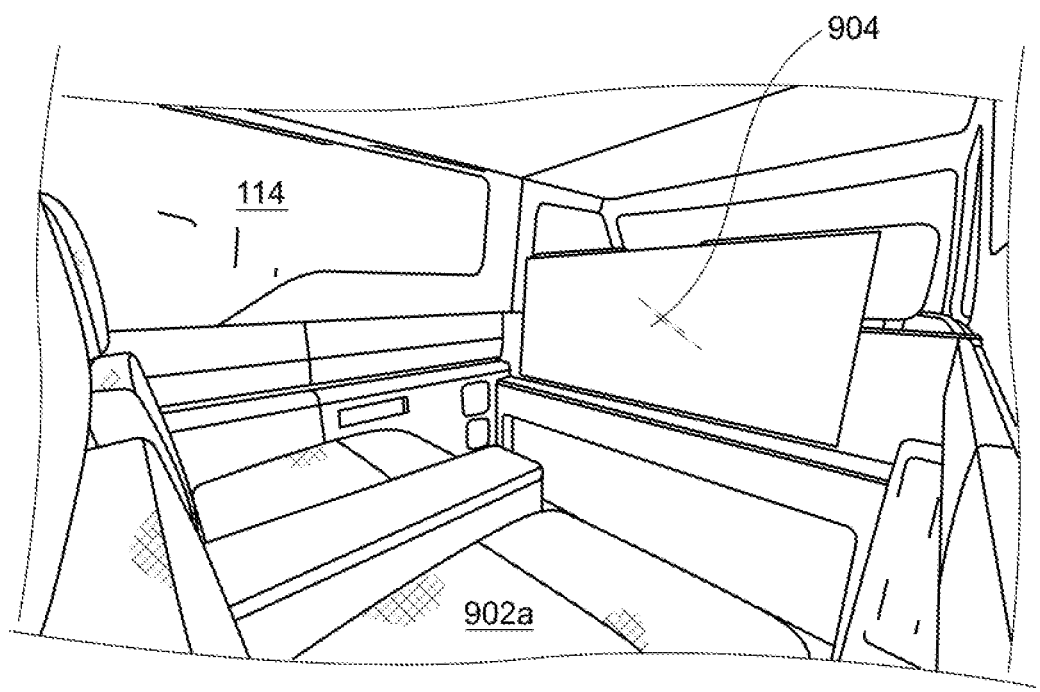

As FIG. 9B shows, the interior space 114 of a long van that contains one or more interior components. Continuing with FIG. 9C, the interior space 114 of a back seat shows a large television display screen, a spart of an entertainment system 904. The entertainment system 904 may also have a digital connectivity feature that allows for various types of communication devices to interconnect and connect to the Internet. Additionally, the newer aspects of the technology insure adaptation of new regulatory requirements.

Figure 9D:
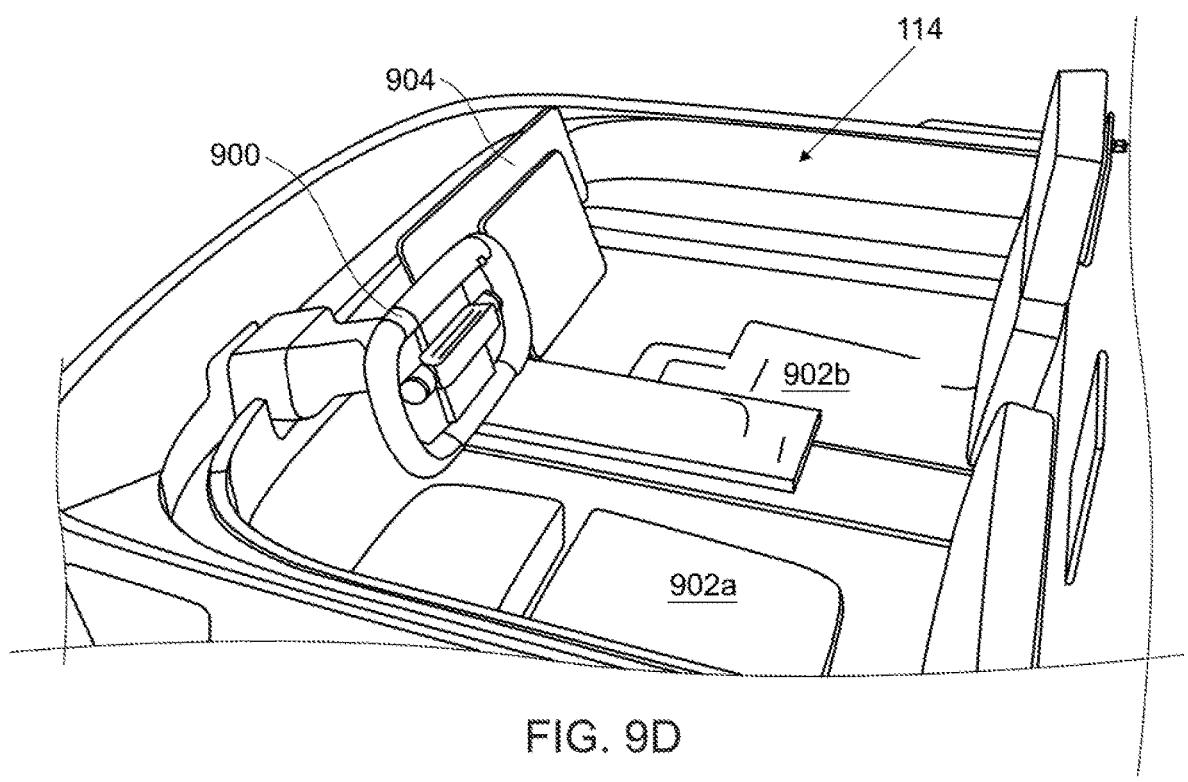
Figure 9E:
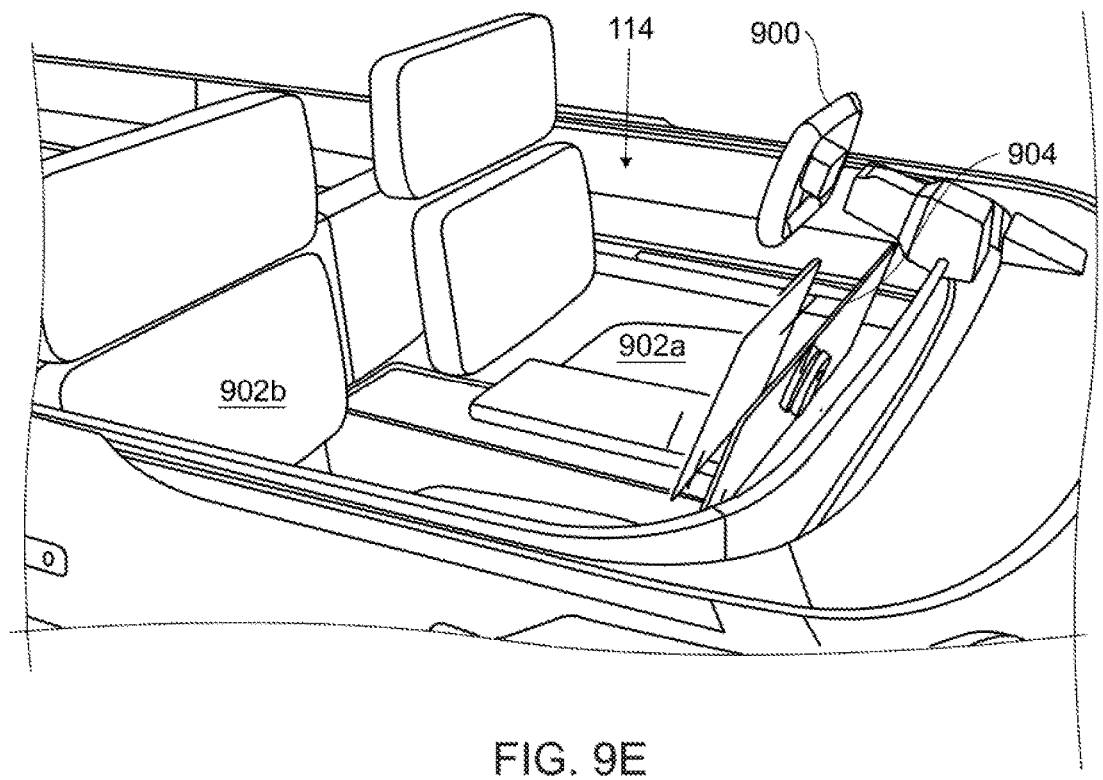

Looking now at another embodiment of a rear and frontal view of an interior space 114 of the electric vehicle, in FIG. 9D and FIG. 9E, the steering wheel 900, the seat cushion 902a, 902b, along with the display for the entertainment system 904 are shown in a standard position. However, changes could be made, such as removing the display and adding another electronic device. Or interchanging the color of the seat cushions, as described in FIGS. 10A-10E, below. In any case, multiple different arrangements for the seat cushion and entertainment system are possible due to the modular, interchangeable configuration of the interior components. This interchangeability also enables recycling of used interior components.

Figure 10A:
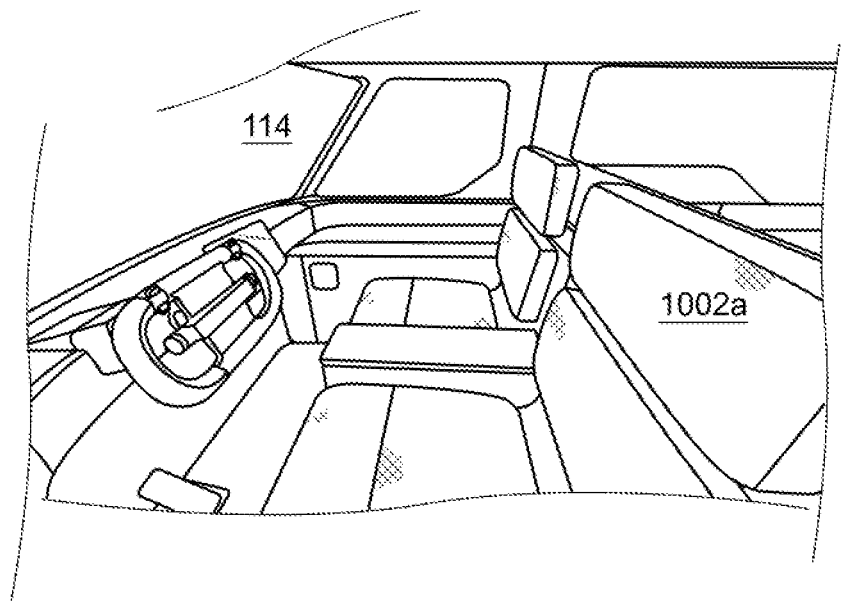
FIGS. 10A-10E illustrate perspective views of different seat cushions used interchangeably in the interior space of the cabin module, in accordance with an embodiment of the present invention.
Figure 10B:
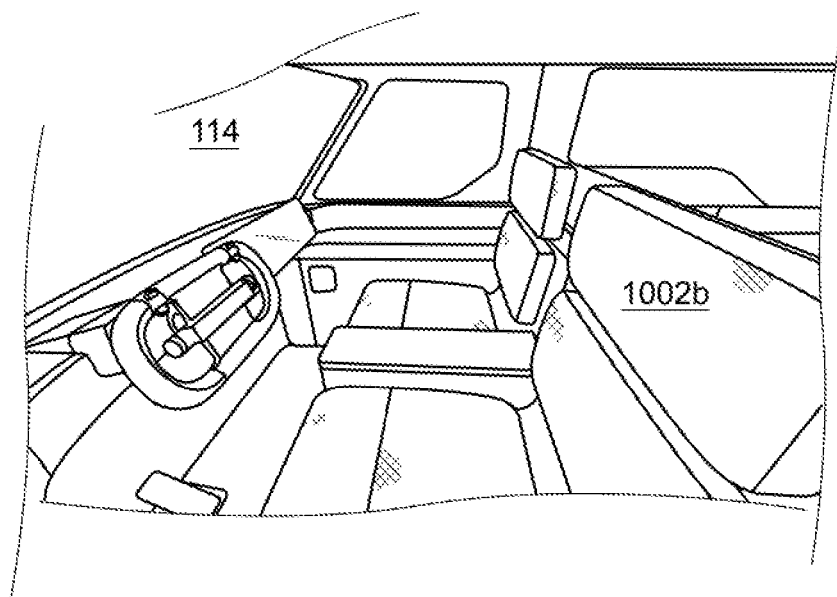
Figure 10C:
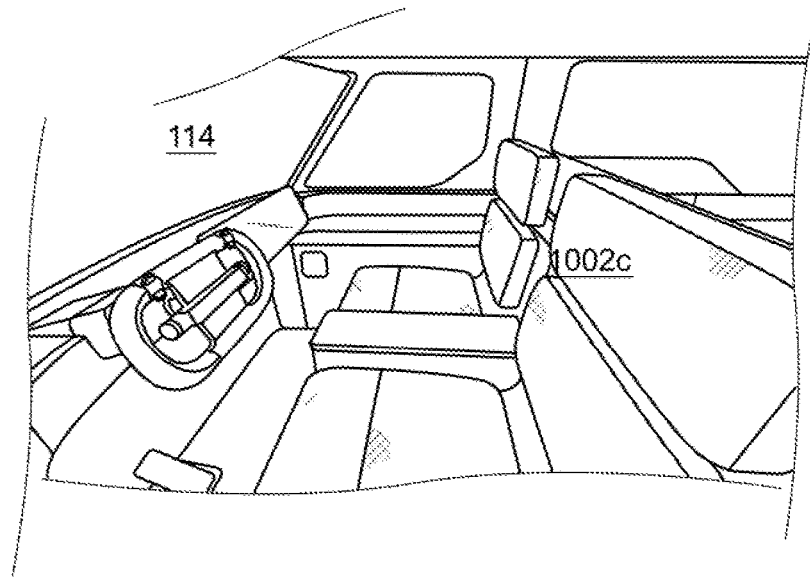
Figure 10D:
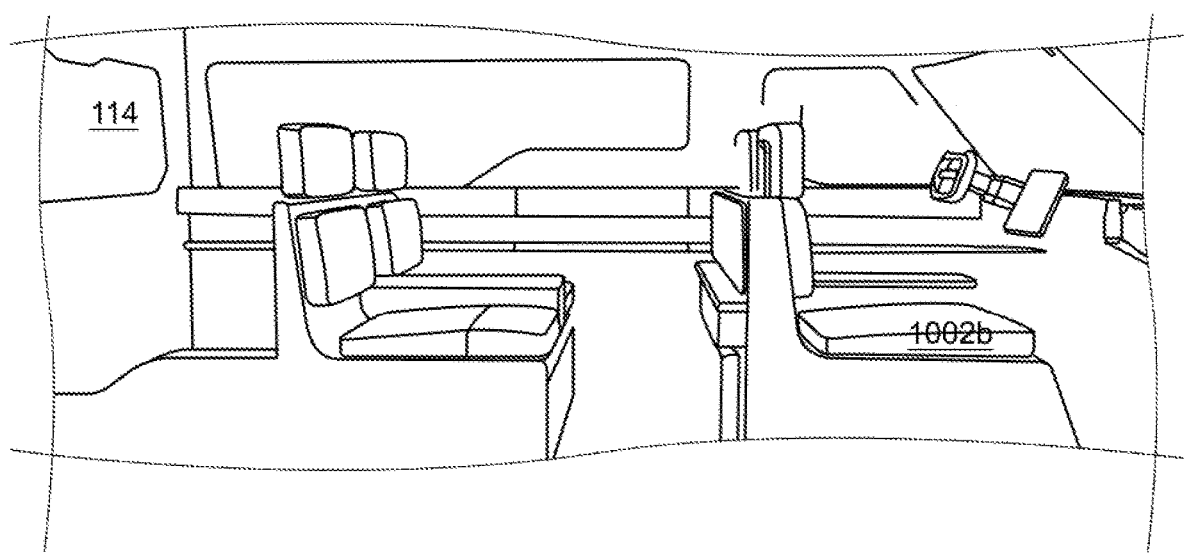
Figure 10E:
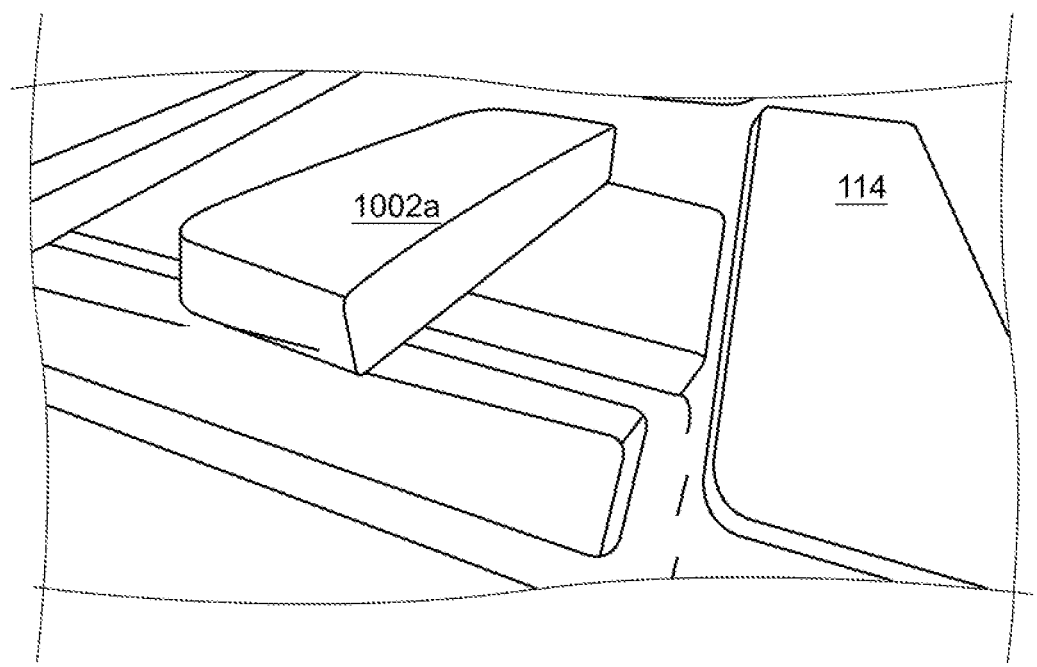

Looking now at FIGS. 10A-10E, the interior components are interchangeable for both purposes of function and aesthetics. For example, the seat cushions can easily be interchanged to have different colors, or different levels of firmness for back support. The interior space 114 also supports a unique entertainment system 100. FIG. 10A shows a gray seat cushion 1002a. FIG. 10B illustrates a white seat cushion 1002b. FIG. 10C illustrates a black seat cushion 1002c. Looking now at FIG. 10D, the white seat cushion 1002b is attached to both the front and rear sections of the interior space of the cabin module 108. A table seating arrangement in the interior space of a van cabin module also utilizes the gray seat cushion 1002a (See FIG. 10E). It is significant to not that myriad seat cushion and entertainment system configurations are possible due to the modular, interchangeable configuration of the interior components.

Figure 11A:
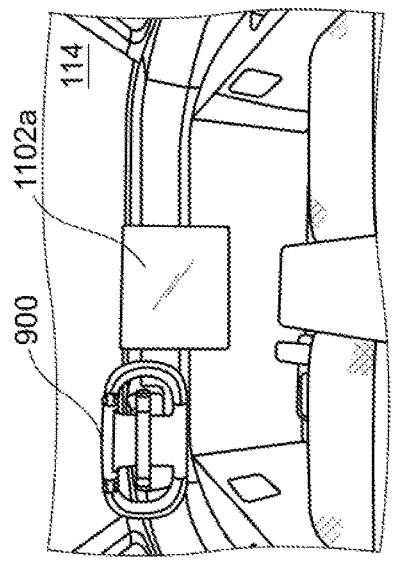
FIGS. 11A-11C illustrate perspective views of different entertainment systems used interchangeably in the interior space of the cabin module, in accordance with an embodiment of the present invention.
Figure 11B:
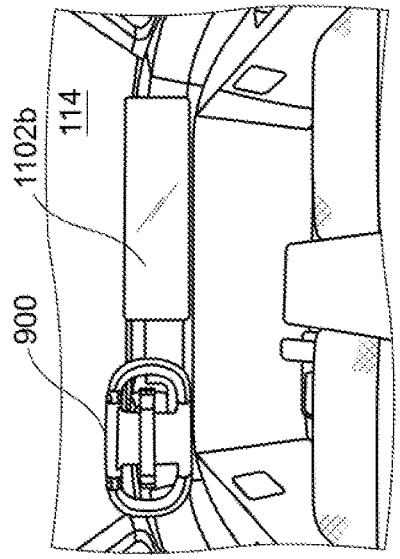
Figure 11C:
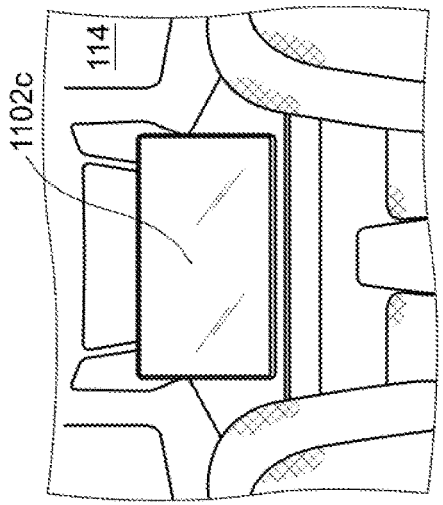
Figure 12:
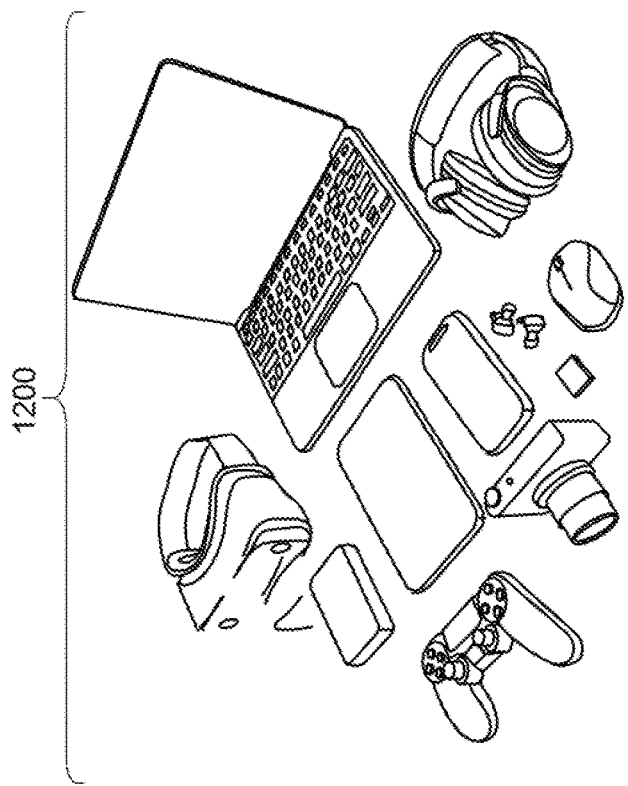
FIG. 12 illustrates a perspective view of electrical accessories used with the entertainment system inside the interior space of the cabin module, in accordance with an embodiment of the present invention.

Turning now to the interior space 114 shown in FIGS. 11A-11C, an entertainment system 1100 and accompanying electrical accessories 1200 allow the vehicle system 100 to provide interchangeable and fresh new entertainment while driving. A small display screen 1102a operates at the front dashboard, as shown in FIG. 11A. A medium sized display screen 1102b is shown replacing the small display screen 1102a in FIG. 11B. Looking now at FIG. 11C, a large display screen 1102c operates in the back seat of the cabin module 108. The display screens may be used for watching television, or as a computer display, or possibly for managing accessories and maps. Various electrical accessories 1200, shown in FIG. 12, may operate with the display screens. The electrical accessories 1200 may include, a speaker, a joystick, a headphone, virtual glasses, earbuds, a mouse, a smartphone, and a tablet.

Looking back to FIG. 1, the vehicle system 100 provides one or more rear operational modules 110 that are interchangeably and detachably attached to the receiving dock 208 at the rear end 206f of the cabin module 108. The operational modules 110 are configured to create the unique operational mode for each version of the vehicle system 100. In some embodiments, the cabin module 108 fits directly onto the receiving dock 208. The cabin module 108 may fit into the receiving dock 208 through a snap fit relationship, or may utilize fasteners, such as bolts, magnets, screws, and the like to stay fastened to attachment points on the receiving dock.

Figure 13D:
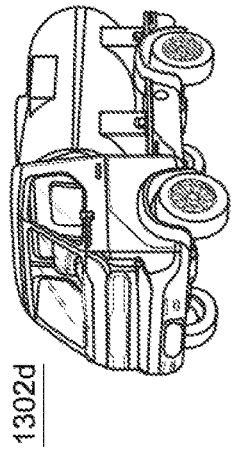
FIGS. 13A-13G illustrate perspective view of the vehicle system, showing multiple combinations of the rear operational modules attached to the receiving dock at the rear end of the cabin module, in accordance with an embodiment of the present invention.
Figure 13E:
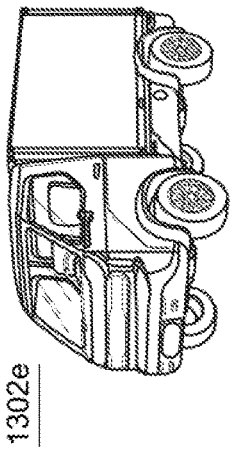
Figure 13F:
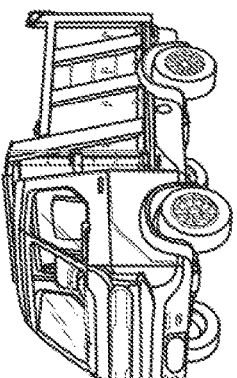
Figure 13G:
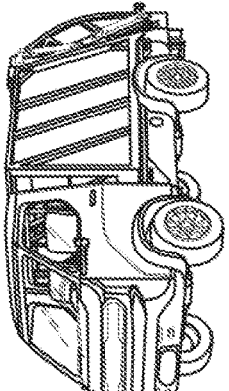
Figure 13B:
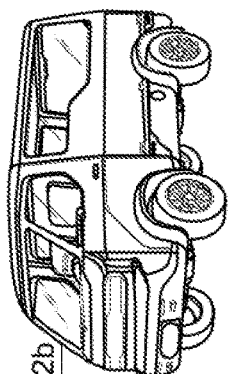
Figure 13C:
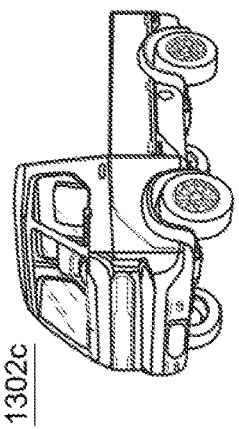
Figure 13A:
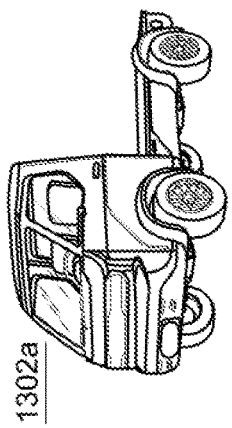

Looking now at FIGS. 13A-13G, any combination of an assortment of rear operational modules 1300a-g attaches to the receiving dock at the rear end of the cabin module 108, such that multiple operational modes 1400a-d are formed. In some embodiments, the rear operational modules 110 include at least one of the following: a tractor cabin module 1302a is shown in FIG. 13A; a van shell cabin module 1302b is shown in FIG. 13B; a pickup truck cabin module 1302c is shown in FIG. 13C; a tanker cabin module 1302d is shown in FIG. 13D; a delivery van shell cabin module 1302e is shown in FIG. 13E; a dump truck cabin module 1302f is shown in FIG. 13F; and a waste truck cabin module 1302g is shown in FIG. 13G.

Figure 14A:
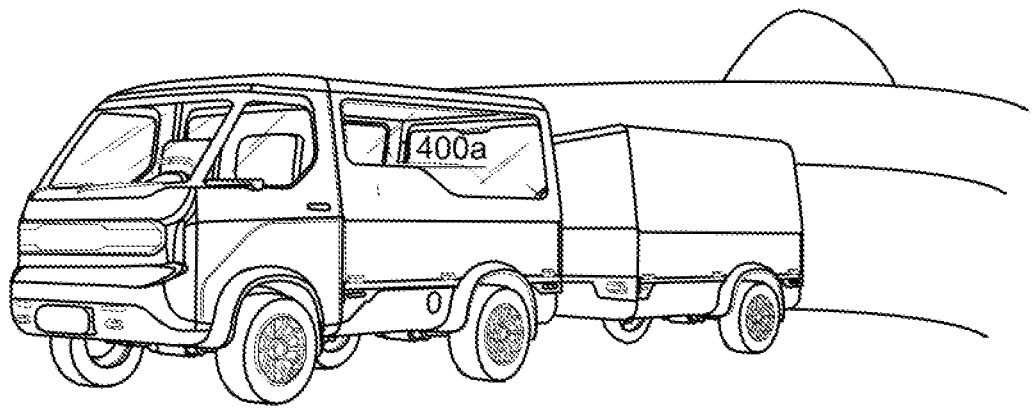
FIGS. 14A-14D illustrate perspective view of multiple operational modes for the vehicle system, in accordance with an embodiment of the present invention.
Figure 14B:
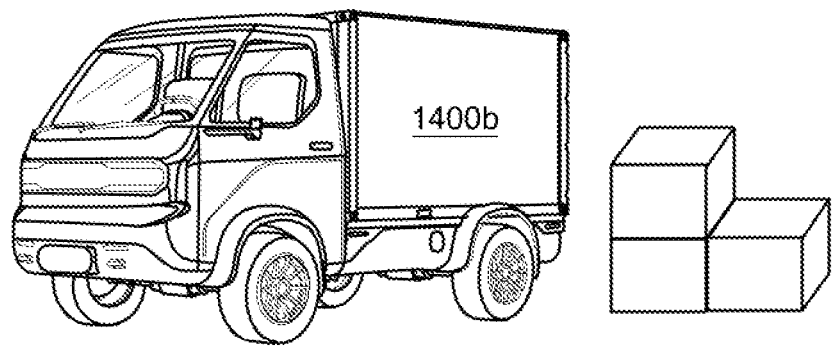

Thus, by interchanging the rear operational modules 1300a-g, different operational modes for the vehicle system 100 can be achieved. FIGS. 14A-14D references four different possible operational modes 1400a-d. One of the operational modes, shown in FIG. 14A, is a work van with trailer operational mode 1400a, having a van shell cabin module 1302e. Turning to FIG. 14B, a multipurpose delivery van operational mode 1400b can be used for delivering items. It is significant to note that both operational modes 1400a and 1400b can be interchanged by changing the respective cabin modules.

Figure 14C:
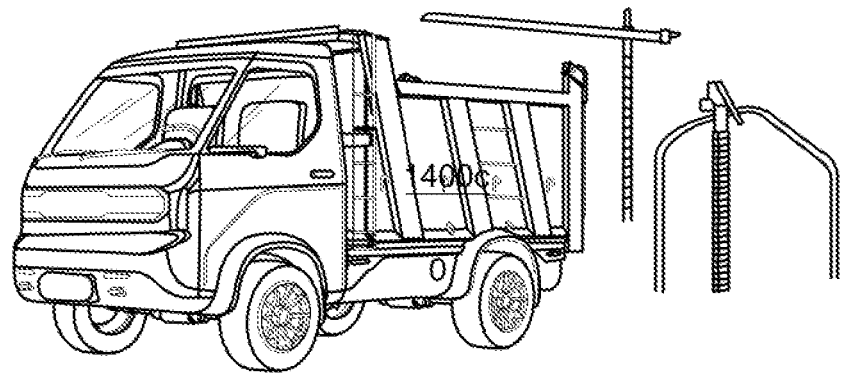
Figure 14D:
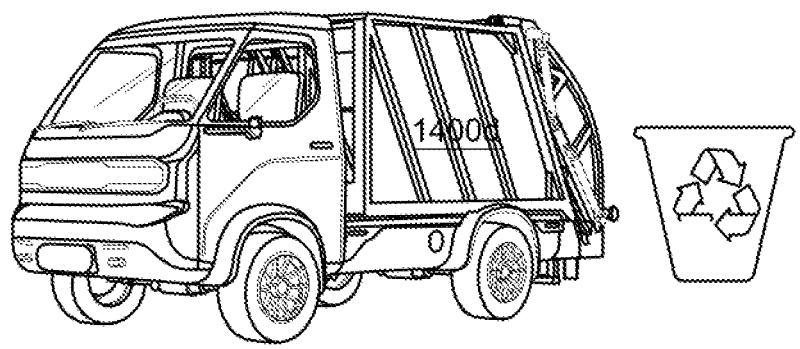

Further, a dump truck operational mode 1400c is shown in FIG. 14C. The dump truck operational mode 1400c allows the vehicle system 100 to carry large loads, like dirt and sand. Yet another operational mode is a waste truck operational mode 1400d, which has a hinge and hammer that pivotably carry a recycle dumper (See FIG. 14D). Additional operational modes may include, without limitation, a personal transport vehicle mode, a service vehicle mode, and a commercial vehicle mode.

Figure 15A:
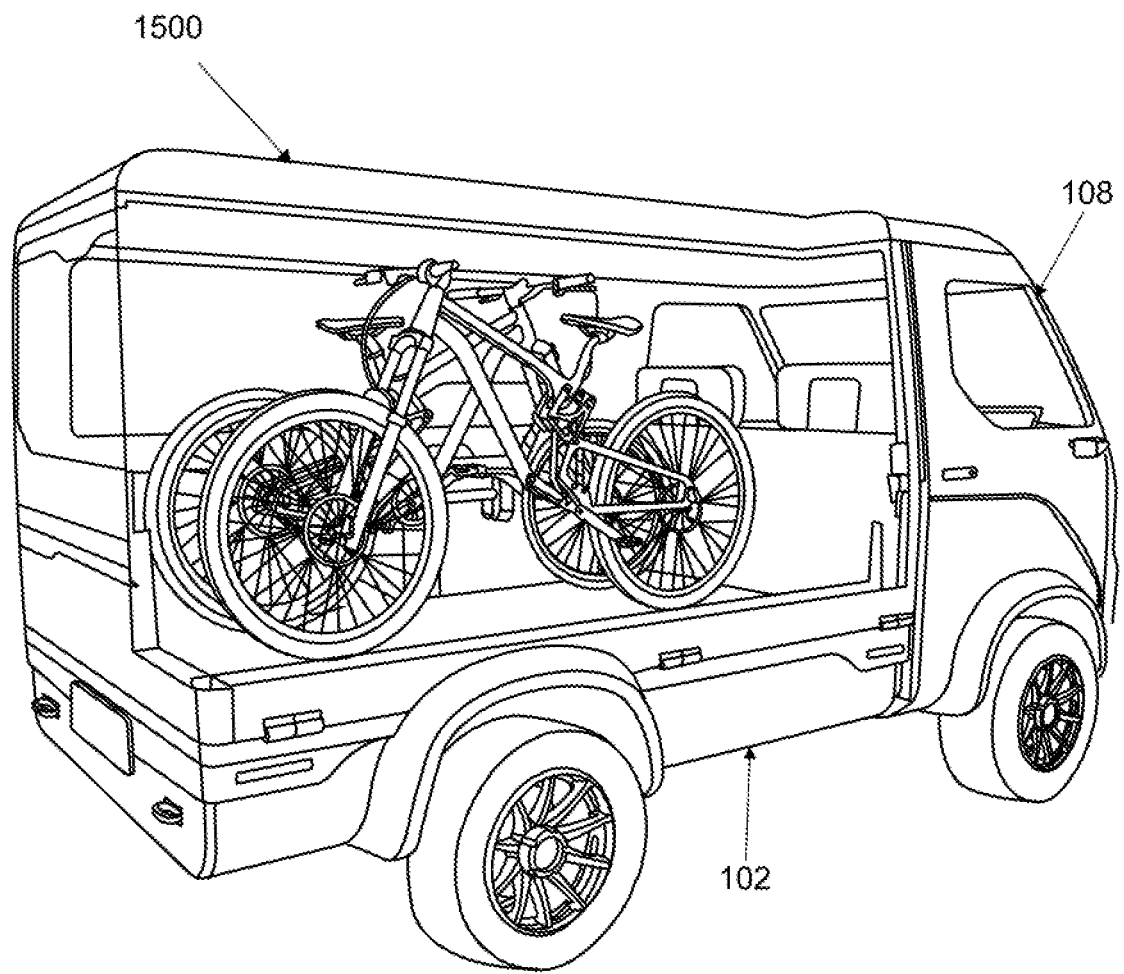
FIGS. 15A-15C illustrate a sectioned view of a van operational module having an extended height and extra-large cargo area, in accordance with an embodiment of the present invention.
Figure 15B:
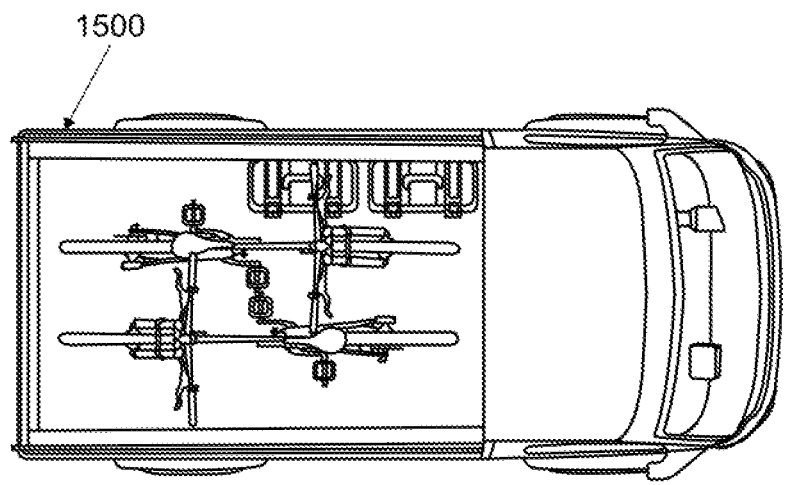
Figure 15C:
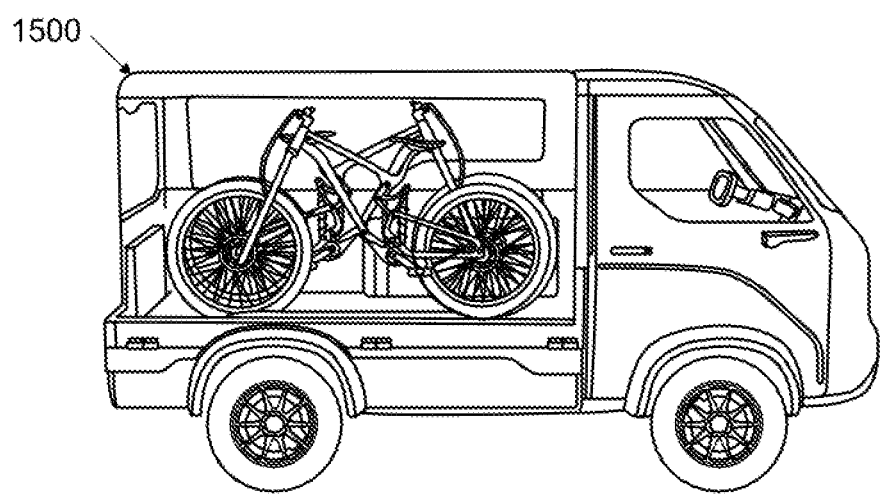

By using such interchangeable operational modules, the amount, type, and dimensions of items being carried therein may be varied. FIG. 15A shows a sectioned view of a van operational module 1500 that has an extended height and extra-large cargo area of 120~155 ft cubed, and 148.5 ft cubed would be a better option. In this case, the van operational module 1500 carries multiple bicycles in an upright position. Additionally, the roof panel on the cabin module 108 can be replaceable, and interior space can be expanded with a roof panel extender. For example, FIGS. 15B and 15C illustrate a top view and side view of the extended roof panel. Conversely, an extra-small cabin module could be used to hold smaller items.

Figure 16:
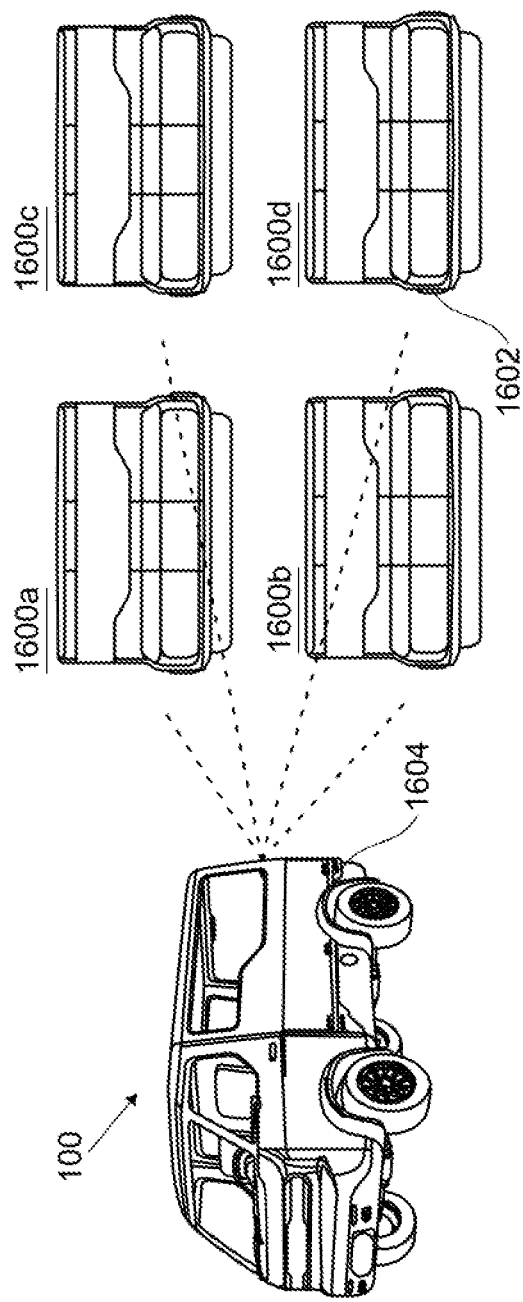
FIG. 16 illustrates a perspective view of the chassis module wirelessly towing multiple autonomous trailers, in accordance with an embodiment of the present invention.

Looking now at FIG. 16, the vehicle system 100 also utilizes at least one autonomous trailer 1600a, 1600b, 1600c, 1600d that can be towed behind the chassis module 102. In some embodiments, more than one autonomous trailer 1600a-d can be used in tow, behind the chassis module 102. As illustrated, four trailers 1600a-d are following the chassis module 102 wirelessly. This wireless towing capacity is possible because the autonomous trailers 1600a-d comprises a receiver 1602 that is used for remote communication with the chassis module 102. Further, the chassis module 102 and/or cabin module 108 comprises a transmitter 1604 that is in communication with the receiver 1602 of the autonomous trailers 1600a-d. In this manner, the transmitter 1604 is operable to transmit a command signal that commands the autonomous trailer 1600a-d to follow the chassis module 102 during motion. In this manner, the chassis module 102 can pull any number of trailers in this wireless arrangement for pulling trailers.

Figure 17:
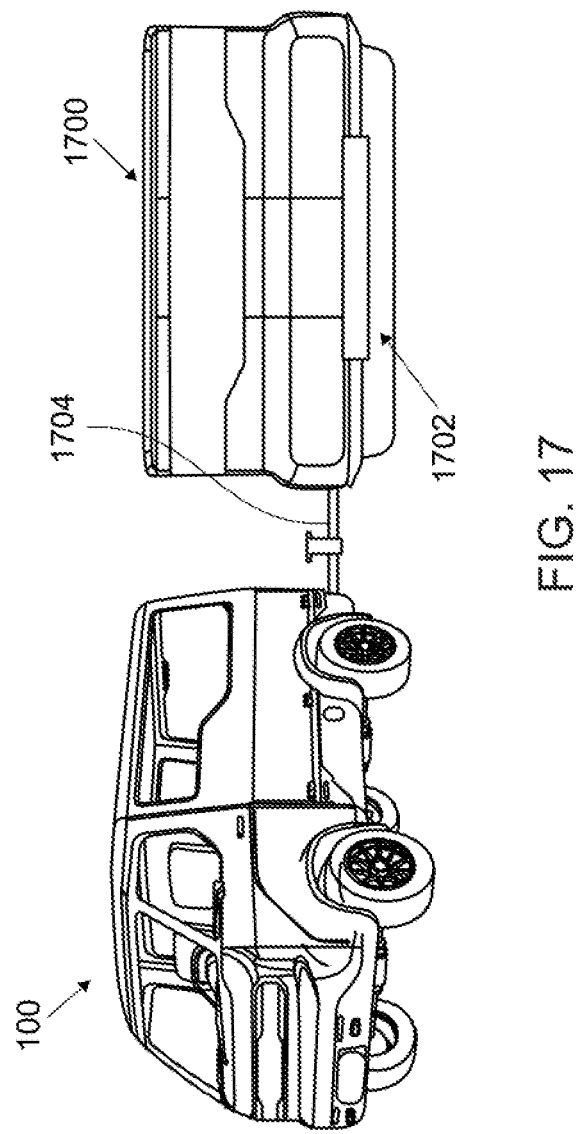
FIG. 17 illustrates a perspective view of the chassis module towing an autonomous trailer with a mechanical link, in accordance with an embodiment of the present invention.
Figure 18:
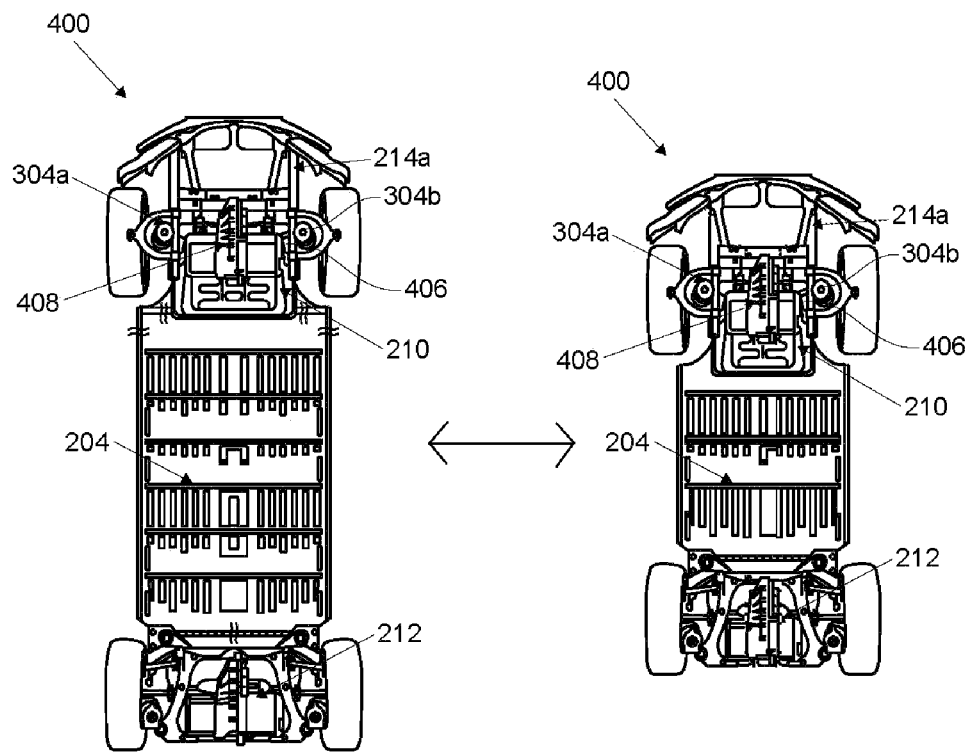
FIG. 18 shows the chassis module's longitudinal and the width is size-adjustable, in accordance with an embodiment of the present invention.

However, in one embodiment, referenced in FIG. 17, the vehicle system 100 provides a physical link tow bar 1704 that is sized and dimensioned to mechanically link the at least one autonomous trailer 1600a-d to the rear end of the chassis module 102 or cabin module 108. The towbar 1704 can include a steel bar that attaches at both ends to the chassis module 102 or the cabin module 108, and the end of the autonomous trailer 1600a-d. In one embodiment, a solar panel 1700 is operational on the roof panel for generating electricity to power the electric motor 212. In another embodiment, a second electric battery pack 1702 may be used with the first battery pack, whereby the second electric battery pack 1702 serves as a backup power source.

In conclusion, multipurpose vehicle system 100 with interchangeable operational components and power supplies is operational in multiple operational modes. The operational modes 1400a-d may include, without limitation, a personal transport vehicle mode, a service vehicle mode, and a commercial vehicle mode. The vehicle system 100 has a dimensionally adjustable chassis module that can increase/decrease the longitudinal 300 and width 302. The chassis module 102 has the capacity to detachably attach to multiple exterior, interior, motor, and transmission components.

Continuing with conclusion, the chassis module 102 supports a cabin module and a rear module that enables formation of different iterations of vehicles. The vehicle system provides multiple different and interchangeable power supplies, like a rechargeable battery and a hydrogen tank. The power supplies are interchangeable. The used components can be recycled and interchanged with new components. This increases the shelf life, and renewal capabilities of the vehicle. The vehicle system 100 also comprises at least one autonomous trailer that comprises a receiver in communication with a transmitter in the chassis module, allowing the autonomous trailer to be remotely towed by the chassis module 102.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A multipurpose vehicle system with interchangeable operational components and power supplies, the system comprising:

a vehicle having a chassis module, a cabin module, and one or more rear operational modules, the chassis module defined by a front end, a rear end, a pair of lateral sides, and a power supply compartment, the longitudinal and the width of the chassis module being size-adjustable, the chassis module having:
   at least one frame assembly;
   multiple wheels being detachably attachable to the frame assembly, the wheels being rotatable, so as to enable mobility of the chassis module;
   an electric motor operatively connected to the wheels for rotatably driving the wheels, the electric motor being detachably attachable to the frame assembly;
   a transmission assembly operatively joined with the wheels and the electric motor, the transmission assembly being operable to transmit power from the electric motor to the wheels, the transmission assembly being detachable from the chassis module; and
   a rechargeable battery pack operatively connected to the electric motor, the rechargeable battery pack being operable to charge the electric motor, the rechargeable battery pack being detachable from the power supply compartment;
the cabin module detachably attached to the chassis module, the cabin module defined by a top end, a front end, a left side, a right side, a rear end having a receiving dock, and an interior space, the cabin module having:
   one or more front panels detachably attached to the front end of the cabin module;
   one or more rear panels detachably attached to the rear end of the cabin module;
   one or more side panels detachably attached to the left and right sides of the cabin module; and
   one or more roof panels detachably attached to the top end of the cabin module; and
the one or more rear operational modules being interchangeably and detachably attached to the receiving dock at the rear end of the cabin module,
whereby any combination of the rear operational modules attaches to the receiving dock at the rear end of the cabin module, such that multiple operational modes are formed.

2. The system of claim 1, wherein the one or more rear operational modules include at least one of the following: a van shell, a tanker, a delivery van shell, a dump truck trailer, and a waste truck trailer.

3. The system of claim 2, wherein the operational modes include at least one of the following: a personal transport vehicle mode, a service vehicle mode, and a commercial vehicle mode.

4. The system of claim 1, wherein the chassis module comprises a power inverter, the power inverter operatively connected to the electric motor.

5. The system of claim 1, further comprising multiple suspension devices operatively joined with the wheels, the suspension devices operable to maintain a vertical load on the wheels, the suspension devices being detachably attachable to the chassis module.

6. The system of claim 5, wherein the suspension devices include at least one of the following: struts, shock absorbers, and springs.

7. The system of claim 1, wherein the rechargeable battery pack comprises a lithium ion battery pack.

8. The system of claim 1, wherein the interior space contains one or more interior components.

9. The system of claim 8, wherein the interior components include at least one of the following: a cushion, a display screen, a sound system, a remote control, a central air system, and a trim.

10. The system of claim 1, wherein the transmission assembly comprises a single-speed transmission assembly.

11. The system of claim 1, wherein the front and rear panels are operational to illuminate.

12. The system of claim 1, wherein the roof panels include at least one of the following: a cargo mount, a roof extension, a transparent sun roof, and a solar panel, the solar panel being operatively connected to the rechargeable battery pack.

13. The system of claim 12, wherein the rechargeable battery pack receives electrical power through at least one of the following: a power cord, an electromagnetic induction mechanism, and the solar panel.

14. The system of claim 1, further comprising at least one autonomous trailer comprising a receiver.

15. The system of claim 14, wherein the chassis module comprises a transmitter in communication with the receiver of the at least one autonomous trailer, whereby the transmitter is operable to transmit a command signal for the autonomous trailer to follow the chassis module during motion.

16. The system of claim 15, further comprising a tow bar operational to mechanically link the at least one autonomous trailer to the rear end of the chassis module.

17. A multipurpose vehicle system with interchangeable operational components and power supplies, the system comprising:
   a vehicle having a chassis module, a cabin module, and one or more rear operational modules,
   the chassis module defined by a front end, a rear end, a pair of lateral sides, and a power supply compartment, the longitudinal and the width of the chassis module being size-adjustable, the chassis module having:
      at least one frame assembly;
      multiple wheels being detachably attachable to the frame assembly, the wheels being rotatable, so as to enable mobility of the chassis module;
      multiple suspension devices operatively joined with the wheels, the suspension devices operable to maintain a vertical load on the wheels, the suspension devices being detachably attachable to the chassis module;
      an electric motor operatively connected to the wheels for rotatably driving the wheels, the electric motor being detachably attachable to the frame assembly;
      a power inverter, the power inverter operatively connected to the electric motor;
      a transmission assembly operatively joined with the wheels and the electric motor, the transmission assembly being operable to transmit power from the electric motor to the wheels, the transmission assembly being detachable from the chassis module;
      a fuel cell operatively connected to the electric motor, the fuel cell operable to charge the electric motor; and
      a hydrogen tank operatively connected to the fuel cell, the hydrogen tank being operable to power the fuel cell, the hydrogen tank being detachably attached to the power supply compartment;
   the cabin module detachably attached to the chassis module, the cabin module defined by a top end, a front end, a left side, a right side, a rear end having a receiving dock, and an interior space, the cabin module having:

one or more front panels detachably attached to the front end of the cabin module;
one or more rear panels detachably attached to the rear end of the cabin module;
one or more side panels detachably attached to the left and right sides of the cabin module; and
one or more roof panels detachably attached to the top end of the cabin module; and
the one or more rear operational modules being interchangeably and detachably attached to the receiving dock at the rear end of the cabin module,
whereby any combination of the rear operational modules attaches to the receiving dock at the rear end of the cabin module, such that multiple operational modes are formed.

18. The system of claim 17, further comprising at least one autonomous trailer comprising a receiver.

19. The system of claim 17, wherein the chassis module comprises a transmitter in communication with the receiver of the at least one autonomous trailer, whereby the transmitter is operable to transmit a command signal for the autonomous trailer to follow the chassis module during motion.

20. A multipurpose vehicle system with interchangeable operational components and power supplies, the system comprising:
a vehicle having a chassis module, a cabin module, and one or more rear operational modules,
the chassis module defined by a front end, a rear end, a pair of lateral sides, and a power supply compartment, the longitudinal and the width of the chassis module being size-adjustable, the chassis module having:
at least one frame assembly;
multiple wheels being detachably attachable to the frame assembly, the wheels being rotatable, so as to enable mobility of the chassis module;
multiple suspension devices operatively joined with the wheels, the suspension devices operable to maintain a vertical load on the wheels, the suspension devices being detachably attachable to the chassis module;
an electric motor operatively connected to the wheels for rotatably driving the wheels, the electric motor being detachably attachable to the frame assembly;
a power inverter, the power inverter operatively connected to the electric motor;
a transmission assembly operatively joined with the wheels and the electric motor, the transmission assembly being operable to transmit power from the electric motor to the wheels, the transmission assembly being detachable from the chassis module; and
a rechargeable battery pack operatively connected to the electric motor, the rechargeable battery pack being operable to charge the electric motor, the rechargeable battery pack being detachable from the power supply compartment of the chassis module;
the cabin module detachably attached to the chassis module, the cabin module defined by a top end, a front end, a left side, a right side, a rear end having a receiving dock, and an interior space, the cabin module having:
one or more front panels detachably attached to the front end of the cabin module;
one or more rear panels detachably attached to the rear end of the cabin module;
one or more side panels detachably attached to the left and right sides of the cabin module;
one or more roof panels detachably attached to the top end of the cabin module, the roof panels including at least one of the following: a cargo mount, a roof extension, a transparent sun roof, and a solar panel, the solar panel being operatively connected to the rechargeable battery pack; and
the one or more rear operational modules being interchangeably and detachably attached to the receiving dock at the rear end of the cabin module,
whereby any combination of the rear operational modules attaches to the receiving dock at the rear end of the cabin module, such that multiple operational modes are formed; and
at least one autonomous trailer comprising a receiver,
whereby the chassis module comprises a transmitter in communication with the receiver of the autonomous trailer, the transmitter being operable to transmit a command signal for the autonomous trailer to follow the chassis module during motion.

* * * * *